(12) United States Patent
Lobert et al.

(10) Patent No.: US 9,896,534 B2
(45) Date of Patent: Feb. 20, 2018

(54) ALKOXYSILYL-CONTAINING ADHESIVE SEALANTS WITH INTRINSICALLY REDUCED VISCOSITY

(71) Applicant: Evonik Degussa GmbH, Essen (DE)

(72) Inventors: Matthias Lobert, Essen (DE); Anke Lewin, Duesseldorf (DE); Michael Ferenz, Essen (DE); Frank Schubert, Neukirchen-Vluyn (DE)

(73) Assignee: Evonik Degussa GmbH, Essen (DE)

( * ) Notice: Subject to any disclaimer, the term of this patent is extended or adjusted under 35 U.S.C. 154(b) by 81 days.

(21) Appl. No.: 15/101,819

(22) PCT Filed: Nov. 26, 2014

(86) PCT No.: PCT/EP2014/075607
§ 371 (c)(1),
(2) Date: Jun. 3, 2016

(87) PCT Pub. No.: WO2015/082264
PCT Pub. Date: Jun. 11, 2015

(65) Prior Publication Data
US 2016/0311963 A1   Oct. 27, 2016

(30) Foreign Application Priority Data
Dec. 3, 2013 (DE) .................. 10 2013 224 708

(51) Int. Cl.
| | |
|---|---|
| *C08G 18/00* | (2006.01) |
| *C08G 18/50* | (2006.01) |
| *C08G 18/75* | (2006.01) |
| *C08G 18/22* | (2006.01) |
| *C08G 18/28* | (2006.01) |
| *C08G 18/48* | (2006.01) |
| *C09J 175/08* | (2006.01) |
| *C08G 65/26* | (2006.01) |

(52) U.S. Cl.
CPC ....... *C08G 18/5096* (2013.01); *C08G 18/227* (2013.01); *C08G 18/283* (2013.01); *C08G 18/4808* (2013.01); *C08G 18/4812* (2013.01); *C08G 18/755* (2013.01); *C08G 65/2606* (2013.01); *C08G 65/2639* (2013.01); *C08G 65/2663* (2013.01); *C09J 175/08* (2013.01); *C08G 2170/00* (2013.01); *C08G 2190/00* (2013.01); *C08G 2650/24* (2013.01)

(58) Field of Classification Search
None
See application file for complete search history.

(56) References Cited

U.S. PATENT DOCUMENTS

| | | | |
|---|---|---|---|
| 4,528,112 A | 7/1985 | Speranza et al. | |
| 5,689,012 A * | 11/1997 | Pazos ................ | C08G 65/2696 502/175 |
| 5,777,177 A * | 7/1998 | Pazos .................... | C08G 18/14 502/175 |
| 6,359,101 B1 * | 3/2002 | O'Connor .......... | C08G 18/4866 525/403 |
| 6,491,846 B1 * | 12/2002 | Reese, II ............. | C08G 18/283 252/182.24 |
| 8,324,419 B2 * | 12/2012 | Mijolovic .......... | C08G 64/0208 558/276 |
| 2010/0105843 A1* | 4/2010 | Knott ................. | C08G 65/2639 525/474 |
| 2013/0237616 A1 | 9/2013 | Ferenz et al. | |

OTHER PUBLICATIONS

International Search Report dated Mar. 27, 2015 in PCT/EP2014/075607 (with English language translation).

* cited by examiner

*Primary Examiner* — Robert S Loewe
(74) *Attorney, Agent, or Firm* — Philip P. McCann; Smith Moore Leatherwood LLP

(57) ABSTRACT

The present invention provides specific alkoxylation products, a process for preparing them, compositions comprising these alkoxylation products, and their use.

19 Claims, No Drawings

ALKOXYSILYL-CONTAINING ADHESIVE SEALANTS WITH INTRINSICALLY REDUCED VISCOSITY

The present invention relates to specific alkoxylation products, to a process for preparing them, to compositions comprising these alkoxylation products, and to their use, more particularly as adhesives and sealants containing alkoxysilyl groups.

In a multiplicity of operational procedures and manufacturing processes, an increasingly important role is being played by the use of adhesives and adhesive sealants, which additionally fulfill a sealing function. Relative to other joining processes, such as welding or riveting, for example, these processes offer advantages in terms of weight and costs, but also advantages in the transfer of stress between the components joined.

As compared with the joining of different materials, adhesive bonding has the advantage, moreover, that it is able to compensate the differences in deformation behaviour and in thermal expansion coefficients of the materials, especially when elastic adhesives are used, and hence actually allows such combinations of materials to be joined.

In the literature there are various examples of elastic adhesives. In recent years, in particular, adhesives based on what are called silane-modified polymers have found widespread application by virtue of their universal usefulness. Many examples in the literature address the formulation of adhesive, adhesive sealant and sealant systems for a multiplicity of applications. Mention may be made here, only by way of example, of specifications WO 2006/136211 A1, EP 1036807 B1 and WO 2010/004038 A1, which set out the fundamental concepts of the formulating technologies and formulating constituents that are customary in the art. The base polymer used is customarily a polyether which has been provided, in different processes, with moisture-crosslinking terminal alkoxysilane groups. This product group includes not only the silylated polyethers marketed by the company Kaneka under the name MS Polymer®, but also the so-called silylated polyurethanes (SPUR products, for example Desmoseal® S, Bayer Materials Science).

The use of polyether backbones in these products is an advantage primarily on account of their low glass transition temperature and the elastic deformation characteristics which are thereby ensured even at low temperatures. However, the silylated polyethers as described in specifications JP 09012863, JP 09012861 and JP 07062222, in particular, on account of their weak intermolecular interaction under service conditions, and the associated reduced intermolecular transmission of forces, do not possess the optimum profile for use in adhesives or sealants.

Silylated polyurethanes as described in DE 69831518 (WO 98/47939 A1) are clearly an advantage here, since the urethane functions and the urea functions likewise present in specific products allow a high degree of intermolecular force transmission and hence high strengths on the part of the bonds. Silylated polyurethanes as well, however, are hampered by the problems associated with polyurethane, such as the lack of temperature stability and yellowing stability, for example, and also the UV stability, which for certain applications is not sufficient.

Alkoxylation products can be prepared, according to the prior art, through the reaction of a starter carrying one or more OH groups with propylene oxide and with one or more epoxide-group-containing alkoxysilyl compounds and, depending on embodiment, with one or more comonomers, by means of double metal cyanide catalysts (DMC catalysts), according to EP 2093244 (US 2010/0041910) and the aftertreatment processes described in EP 2415796 (US 2012/028022) and EP 2415797 (US 2012/029090), and also according to the as yet unpublished filing specification DE 10 2012 203737.

Besides the disadvantages discussed in the two previous sections, all of the compounds discussed so far have a further feature which is disadvantageous in many cases. All of the products discussed are based on high molecular mass polyether structures of more than 4000 g/mol, and are therefore accompanied by an increased viscosity. In many cases the viscosity is so high that the formulation of the products in question is made more difficult.

Consequently there is a need for alkoxysilyl-modified polymers which retain without restriction the advantages described above for this class of product, but which at the same time exhibit a much lower viscosity and can therefore be processed more advantageously.

There has been no lack of attempts to counteract this weakness, particularly in the silylated polyethers, by means of adroit formulation. For instance, the addition of plasticizers to the silylated base polymer, in particular, is a widespread possibility for generating alkoxysilyl-functional polymers of lower viscosity and easier processing quality. The profile of properties may be modified, moreover, through the use of reactive diluents, as described in WO 2011/000843 A2 (US 2012/108730 A1).

This approach to solve the problem, however, has found only limited acceptance, since the formulator who formulates the base polymer, through having to add defined components intended to influence the viscosity of the formulation, is robbed of an important degree of freedom—namely that of modifying the free formulation according to his or her wishes.

It was an object of the present invention, accordingly, to prepare compositions comprising alkoxysilyl-modified polymers, which even without assistance from further substances, such as plasticizers or reactive diluents, for example, have viscosities lower than those of comparable, known compositions comprising alkoxysilyl-modified polymers. A further object of the present invention was to provide a simple process for preparing such compositions, and also the provision of curable compositions based on such base polymers.

This object has been achieved by means of compositions with intrinsically reduced viscosity, comprising defined mixtures of alkoxysilyl-modified polymers.

For the purposes of this patent application, compositions with intrinsically reduced viscosity are those compositions comprising alkoxysilyl-modified polymers that exhibit a reduced viscosity as set against comparable alkoxysilyl-modified polymers, known in the prior art, and whose reduced viscosity does not derive from the addition of one or more auxiliary components to the polymer compositions (after their preparation), but instead whose reduced viscosity is brought about intrinsically, in other words "from the inside". The expression "reduced viscosity" in the context of this patent application embraces all viscosities which are reduced by at least 5%, preferably by at least 10%, based on the viscosity of a composition comprising alkoxysilyl-modified polymers with intrinsically reduced viscosity when set against comparable compositions comprising alkoxysilyl-modified polymers, under identical measurement conditions. Compositions of the invention with intrinsically reduced viscosity are obtained preferably by the process that is described in the context of this invention.

Surprisingly it has been found that compositions comprising alkoxysilyl-modified polymers with intrinsically reduced viscosity can be obtained if, during the process of preparing the alkoxysilyl-modified polymers from an OH-functional starter (1), in the alkoxylation step with the addition of alkylene oxide, a further OH-functional starter (2) is added proportionally. The viscosity of the products of the invention is significantly reduced by comparison with that of analogous polymers prepared without addition of OH-functional starters (2), while, surprisingly, there is no difference or no substantial difference at all in the performance properties. This has the advantage in particular that there is no need to supply the polymers of the invention with any further viscosity-reducing auxiliary components in order to obtain a good fluidity, and this reduces costs, significantly simplifies the handling of the polymer and, moreover, allows the polymers of the invention to be formulated more freely. Furthermore, the improved fluidity facilitates the preparation process to a particularly high degree, since here as well, with no need for viscosity-reducing auxiliary components, costs can be reduced and a saving can be made on a step of addition of viscosity-reducing auxiliary components.

The present invention accordingly provides a process for preparing alkoxylation products with intrinsically reduced viscosity as described below.

The present invention further provides compositions with intrinsically reduced viscosity, comprising alkoxylation products formed from at least two different starters.

Likewise provided with the present invention are compositions with intrinsically reduced viscosity, comprising alkoxylation products formed from at least two different starters, and further components, and also the use thereof, especially the use of these alkoxylation products formed from at least two different starters in curable compositions.

The compositions of the invention, the process for preparing them, and their use are described below by way of example, without any intention that the invention should be confined to these exemplary embodiments. When ranges, general formulae or compound classes are specified hereinafter, these shall include not just the corresponding ranges or groups of compounds that are explicitly mentioned but also all sub-ranges and sub-groups of compounds which can be obtained by extracting individual values (ranges) or compounds. Wherever documents are cited within the context of the present description, then their contents, in particular as regards the substantive matter to which reference is made, are deemed as belonging in their entirety to the disclosure content of the present invention. Percentages referred to hereinbelow are by weight, unless otherwise stated. Average values referred to hereinbelow are number averages, unless otherwise stated. Physical properties referred to below, such as viscosities or the like, for example, are those measured at 25° C., unless otherwise stated. The viscosity is determined at a temperature of 25° C. and a shear rate of 10 1/s with an MCR 301 rheometer from Anton Paar.

The hydrophilic or hydrophobic nature of the final alkoxysilyl-functional polymers with intrinsically reduced viscosity may be adjusted through the nature and construction of the starters (1) and (2), which carry one or more OH groups, and/or through one or more comonomers which are introduced during the synthesis. The viscosity of the final alkoxysilyl-functional polymer with intrinsically reduced viscosity may be tailored by the nature and amount, and also the time of addition, of the OH-functional starters (2).

According to EP 2 093 244, the disclosure content of which in relation to the structures disclosed therein is hereby incorporated in full as part of the present description, it was possible for the first time to prepare alkoxylation products which carry alkoxysilyl groups and which, in contrast to the prior art known up until that point, exhibit alkoxysilyl groups distributed randomly or in block fashion along the polyether chain, and not just located at the chain termini. These compounds, furthermore, are notable for a terminal OH group, which is a consequence of the reaction.

The presence of the OH group and the hydrolysis-sensitive alkoxysilyl groups in one molecule are the basis for the intrinsic reactivity of the compounds and ready crosslinkability with formation of three-dimensional polymeric networks. Nevertheless, experiments have also shown that the reactivity of the OH group may be too high to achieve a shelf life sufficient for the requirements imposed on 1-component adhesive and sealant formulations. Shelf life in this context means the stability towards crosslinking or gelling of the completed, catalyst-containing formulation on storage in a standard commercial thick-walled cartridge. The stated compounds include in particular those of the formula (I).

In the context of the present invention the term "alkoxylation products" or "polyethers" encompasses not only polyethers, polyetherols, polyether alcohols and polyetheresterols but also polyethercarbonate-ols, which optionally are used synonymously with one another. In this context it is not necessary for the expression "poly" necessarily to mean that there is a multiplicity of ether functionalities or alcohol functionalities in the molecule or polymer. Instead, it merely indicates that there are at least repeating units of individual monomer components or else compositions which exhibit a higher molar mass and also, furthermore, a specific polydispersity.

The word fragment "poly" in connection with this invention encompasses not only exclusively compounds having at least 3 repeating units of one or more monomers in the molecule, but also, more particularly, those compositions of compounds which exhibit a molecular weight distribution and possess an average molecular weight of at least 200 g/mol. This definition accounts for the circumstance that within the field of art in question it is common to identify such compounds as polymers even when they do not yet appear to satisfy the definition of a polymer as per OECD or REACH guidelines.

The various fragments in the formulae (Ia), (II) and (IIa) below may be distributed statistically. Statistical distributions may have a blockwise construction with an arbitrary number of blocks and an arbitrary sequence, or may be subject to a randomized distribution; they may also be constructed in alternation or else may form a gradient over the chain; in particular they may also form all hybrid forms in which, optionally, groups with different distributions may follow one another. The formulae (I), (Ia), (II) and (IIa) describe polymers which have a molar weight distribution. The indices therefore represent the numerical average over all of the monomer units.

The indices a, b, c, d, e, f, g, h, i, j, k, l, m, n, o, p, q, r, s, t, u, v, w, x and y that are used in the formulae, and also the value ranges for the specified indices, may be understood as average values of the possible statistical distribution of the structures and/or mixtures thereof that are actually present. This applies even to those structural formulae which as such, per se, are reproduced exactly, such as for formula (Ia), (II) and (IIa), for example.

Surprisingly it has now been found that compositions comprising alkoxylation products formed from at least two different OH-functional starters have an intrinsically reduced viscosity. It is essential to the invention here that the composition with intrinsically reduced viscosity comprises at least one alkoxylation product formed from a starter (1) and at least one alkoxylation product formed from a starter (2), where starter (1) and starter (2) must be different from one another. In principle, starter (1) and starter (2) may both be different alcohols, preferably of the alcohols specified below. Starter (2) preferably comprises alcohols and/or polyols such as methanol, 2,2,4-trimethyl-1,3-pentanediol monoisobutyrate (Texanol, available for example from Exxon), octanol, decanol, dodecanol, ethanol, propanol, isopropanol, butanol, isobutanol, tert-butanol, all isomeric pentanols, fatty alcohols such as caproyl alcohol, enanthyl alcohol, caprylyl alcohol, pelargonyl alcohol, capryl alcohol, 1-undecanol, lauryl alcohol, 1-tridecanol, isotridecyl alcohol, myristyl alcohol, 1-pentadecanol, cetyl alcohol, palmoleyl alcohol, 1-heptadecanol, stearyl alcohol, isostearyl alcohol, oleyl alcohol, elaidyl alcohol, petroselinyl alcohol, linolyl alcohol, linolenyl alcohol, 1-nonadecanol, elaeostearyl alcohol, arachyl alcohol, 1-heneicosanol, gadoleyl alcohol, behenyl alcohol, erucyl alcohol and brassidyl alcohol and also their technical mixtures, oxo-process alcohols, preferably those which carry 2 to 4 methyl groups as branches, or Guerbet alcohols which are branched with an alkyl group in position 2, such as 2-ethylhexanol, 2-propylheptanol, 2-butyloctanol, 2-hexyldecanol and/or 2-octyldodecanol, or aromatic starting compounds such as benzyl alcohol and phenol derivatives, catechols or resorcinols, more preferably ethylene glycol, propylene glycol, di/triethylene glycol, 1,2-propylene glycol, di/tripropylene glycol, neopentyl glycol, 1,4-butanediol, 1,2-hexanediol, 1,6-hexanediol, trimethylolpropane, di(trimethylol)ethane, di(trimethylol)propane, pentaerythritol, di(pentaerythritol), glycerol, di(glycerol), polyglycerol, trimethylolpropane monoethers or glycerol monoethers such as monoallyl ethers, for example, more preferably butanol, ethanol or ethylhexanol, especially preferably butanol. Starter (1) and starter (2), especially starter (1), are preferably compounds of relatively high molecular mass, preferably with molar masses of more than 200 g/mol, more preferably more than 300 g/mol and especially preferably more than 400 g/mol, preferably selected from polyethylene oxides, polypropylene oxides, polyesters, polycarbonates, polycarbonate polyols, polyester polyols, polyetheresters, polyetherols, polyethercarbonates, polyamides, polyurethanes and sugar-based alkoxylates which may optionally have one or more alkoxysilyl groups. Starter (1) is selected more preferably from polyetherols, polycarbonate polyols and polyethercarbonates.

Polycarbonate polyols for the purposes of this invention are preferably α, ω-dihydroxy-functional reaction products having at least 3 carbonate units, preferably 3 to 20 carbonate units. Preferred polycarbonate polyols are reaction products of $CO_2$ with diols or cyclic lactones, such as caprolactone, for example, preferably having an average molecular weight of 1000 to 3000 g/mol. Preferred polycarbonate polyols are available on the market, for example, under the brand name ETERNACOLL® PH from UBE Chemical Europe S.A., Polyol C Series from Kuraray Europe GmbH, Duree-ter S from Sumitomo Bakelite Europe, or Desmophen® C from Bayer Material Science GmbH.

Polyethercarbonates for the purposes of this invention are preferably reaction products of the above-defined polycarbonate polyols with alkylene oxides. Polyetherols are preferably reaction products of alkylene oxides, the polyetherols more preferably being polyethylene oxides, polypropylene oxides. Especially preferred are starters (1) selected from polyetherols, polycarbonate polyols and polyethercarbonates, especially in the preferred embodiments observed above, and starters (2) preferably selected from butanol, ethanol or ethylhexanol.

Large reductions in the viscosity are achieved in particular if starter (1) has a molar mass of greater than 400 g/mol and starter (2) has a molar mass of less than or equal to 400 g/mol. Surprisingly it has emerged that, additionally, a particularly effective reduction in the viscosity can be achieved if the molar mass of starter (1) exceeds the molar mass of starter (2) by at least 200 g/mol, preferably by at least 600 g/mol, more preferably by at least 1000 g/mol. With particular preference the molar mass of starter (1) is at least twice as great as the molar mass of starter (2).

For the purposes of this invention, alkoxylation products (1) are obtained through the reaction of starter (1) preferably with alkylene oxides, and alkoxylation products (2) are obtained through the reaction of starter (2) preferably with alkylene oxides. The compositions with intrinsically reduced viscosity, comprising alkoxylation products, are preferably compositions in which the alkoxylation products (1) from starter (1) are constructed from alkylene oxide, preferably at least ethylene oxide and/or propylene oxide, from at least one epoxide which carries alkoxysilyl groups, and optionally from further monomers, and the alkoxylation products (2) from starter (2) are constructed from alkylene oxide, preferably at least ethylene oxide and/or propylene oxide, and optionally from at least one epoxide which carries alkoxysilyl groups, and/or from further monomers. The alkoxylation products (2) from starter (2) are composed preferably of alkylene oxide and at least one epoxide which carries alkoxysilyl groups.

Preferred alkoxylation products (1) are composed of the following monomer fractions: 10 to 97 wt %, preferably 20 to 95 wt %, especially preferably 30 to 90 wt % of propylene oxide, 0 to 60 wt %, preferably 3 to 40 wt %, especially preferably 5 to 30 wt % of ethylene oxide, 0 to 25 wt %, preferably 0.5 to 15 wt %, especially preferably 1 to 10 wt % of epoxide carrying alkoxysilyl groups, and 0 to 25 wt %, preferably 0.1 to 20 wt %, especially preferably 0 to 10 wt % of further monomers, preferably selected from alkylene oxides other than propylene oxide and ethylene oxide, such as butylene oxide, isobutylene oxide, styrene oxide and/or from further comonomers such as ϵ-caprolactone, phthalic anhydride, glycidyl ethers such as tert-butylphenyl glycidyl ether, $C_{12}/C_{14}$ fatty alcohol glycidyl ethers and 2-ethylhexyl glycidyl ether, all wt % figures being based on the total weight of the alkoxylation products (1).

Preferred alkoxylation products (2) are composed of the following monomer fractions: 10 to 97 wt %, preferably 20 to 95 wt %, especially preferably 30 to 90 wt % of propylene oxide, 0 to 60 wt %, preferably 3 to 40 wt %, especially preferably 5 to 30 wt % of ethylene oxide, 0 to 25 wt %, preferably 0.5 to 15 wt %, especially preferably 1 to 10 wt % of epoxide carrying alkoxysilyl groups, and 0 to 25 wt %, preferably 0.1 to 20 wt %, especially preferably 0 to 10 wt % of further monomers, preferably selected from alkylene oxides other than propylene oxide and ethylene oxide, such as butylene oxide, isobutylene oxide, styrene oxide and/or from further comonomers such as ϵ-caprolactone, phthalic anhydride, glycidyl ethers such as tert-butylphenyl glycidyl ether, $C_{12}/C_{14}$ fatty alcohol glycidyl ethers and 2-ethylhexyl glycidyl ether, all wt % figures being based on the total weight of the alkoxylation products (2).

It has further been found that as well as the variation of the molar masses of the starters (1) and (2), the OH functionality of the starters as well may be utilized in order to control the intrinsically reduced viscosity of the compositions of the invention. Accordingly, it is particularly advantageous for reducing the viscosity of the compositions if the starter (1) has a higher OH functionality, in other words more OH groups, than the starter (2). In one particularly preferred embodiment, the starter (1) has t OH groups and starter (2) has t−1 OH groups, where t=2 to 8, preferably 2 to 5, more preferably 2, 3 or 4 and more particularly 2.

The compositions of the invention with intrinsically reduced viscosity preferably comprise alkoxylation products (1) formed from starters (1) which comprise the structural elements of the formula (I).

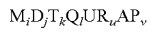

$$M_i D_j T_k Q_l UR_u AP_v \qquad \text{formula (I)}$$

which are characterized by the fact that the fragments M, D, T and Q are linked not to one another but instead with one another via the groups UR and/or AP, and the groups UR and AP are not linked to one another but instead, accordingly, are linked with one another via the fragments M, D, T or Q, As far as the indices are concerned:

i=0 to 16, preferably 1 to 12, more preferably 2 to 6,
j=0 to 10, preferably 1 to 8, more preferably 2 to 6, especially preferably greater than or equal to 1,
k=0 to 6, preferably greater than 0 to 4, more particularly 0.5 to 2,
l=0 to 4, preferably greater than 0 to 3, more particularly 0.5 to 2,
u=0 to 17, preferably 1 to 15, more preferably 2 to 10, more particularly 2 to 8,
v=0 to 6, preferably greater than 0 to 4, more particularly 0.1 to 2,
with the proviso that i+j+k+l>=1,
with M being subject to the following alternatives:
M is independently at each occurrence an oxygen-radical-carrying hydrocarbon radical having a minimum numerical molar mass of 32 g/mol, and, if starter (1) has only one OH functionality (t=1 OH group), having a minimum numerical molar mass of at least 400 g/mol, which may optionally be interrupted by heteroatoms, and is preferably saturated or unsaturated, linear or branched organic hydrocarbon radicals which contain O, N and/or S as heteroatoms, more preferably a polyether, preferably having 8 to 400 carbon atoms, or M is a radical of the formula (Ia) or of the formula (Ib) or of the formula (Ic), where formula (Ia)

w=0 to 200, preferably 1 to 100, more preferably greater than 1 to 80, especially preferably 0 to 50
y=0 to 500, preferably 1 to 300, more preferably 2 to 200 and especially preferably 0 to 100,
e=1 to 10,
f=0 to 2
g=1 to 3
with the proviso that g+f=3
h=0 to 10, preferably 1 to 6, especially preferably 1, 2 or 3
with the proviso that the groups with the indices a, b, c, d, w and y are freely permutable over the molecule chain, it being disallowed for each of the groups with the indices w and y to follow itself or the other respective group, and with the proviso that the various monomer units both of the fragments having the indices a, b, c, d, w and y and of any polyoxyalkylene chain present in the substituent $R^1$ may be constructed blockwise among one another, it also being possible for individual blocks to occur multiply and to be distributed statistically among one another, or else are subject to a statistical distribution and, moreover, are freely permutable with one another, in the sense of being for arrangement in any desired order, with the restriction that each of the groups of the indices w and y must not follow itself or the other respective group, and where
$R^1$=independently at each occurrence a saturated or unsaturated, linear or branched organic hydrocarbon radical which may contain O, S and/or N as heteroatoms, the hydrocarbon radical preferably contains 1 to 400 carbon atoms, preferably 2, 3 or 4 to 200 carbon atoms,
$R^2$=independently at each occurrence an alkyl group having 1 to 8 carbon atoms, more particularly methyl or ethyl, propyl, isopropyl,
$R^3$=independently at each occurrence an alkyl group having 1 to 8 carbon atoms, more particularly methyl, ethyl, propyl, isopropyl,
$R^4$=independently at each occurrence a hydrogen radical, an alkyl group having 1 to 20 carbon atoms, or an aryl or alkaryl group,
preferably hydrogen, methyl, ethyl, octyl, decyl, dodecyl, phenyl, benzyl, more preferably hydrogen, methyl or ethyl, formula (Ia)

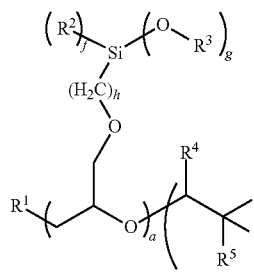

where
a=0 to 100, preferably 1 to 50, more preferably greater than 1 to 10, especially preferably 1 to 5, preferably 1, 2 or 3
b=0 to 1000, preferably 1 to 500, more preferably greater than 1 to 400, especially preferably 10 to 300
c=0 to 200, preferably 1 to 100, more preferably greater than 1 to 80, especially preferably 0 to 50,
d=0 to 200, preferably 1 to 100, more preferably greater than 1 to 80, especially preferably 0 to 50

$R^5$=independently at each occurrence a hydrogen radical or an alkyl group having 1 to 8 carbon atoms,
preferably hydrogen, methyl or ethyl, especially preferably hydrogen, or $R^4$ and one of the radicals $R^5$ may together form a ring which includes the atoms to which $R^4$ and $R^5$ are bonded, this ring preferably containing 5 to 8 carbon atoms, $R^6$ and $R^7$=independently at each occurrence a hydrogen radical, an alkyl group having 1 to 20 carbon atoms, an aryl or alkaryl group and/or an alkoxy group, preferably a methyl group, $R^{11}$=independently at each occurrence a saturated or unsaturated, aliphatic or aromatic hydrocarbon radical having 2 to 30 C atoms, more particularly up to 24 C atoms, which is optionally substituted, being preferably an alkyl group having 1 to 16 carbon atoms, more preferably having 6 to 12 carbon atoms, with a chain which may be interrupted by oxygen and may further carry functional groups, such as, for example, carboxyl groups, esterified optionally with alcohols such as methanol, ethanol, propanol, butanol or hexanol, for example, hydroxyl groups esterified optionally with acids such as acetic acid, butyric acid, neodecanoic acid or (meth)acrylic acid and/or the polymers of (meth)acrylic acid, or an aryl group having 6 to 20 carbon atoms, or an alkaryl group having 7 to 30, preferably 7 to 20, carbon atoms, preferably selected from methyl, ethyl, propyl, butyl, isobutyl, tert-butyl, 2-pentyl, 3-pentyl, 2-methylbutyl, 3-methylbutyl, 2-methyl-2-butyl, 3-methyl-2-butyl, 2,2-dimethylpropyl, hexyl, heptyl, octyl, 2-ethylhexyl, 2-propylheptyl, 2-butyloctanyl, 2-methylundecyl, 2-propylnonyl, 2-ethyldecyl, 2-pentylheptyl, 2-hexyldecyl, 2-butyltetradecyl, 2-dodecylhexadecyl, 2-tetradecyloctadecyl, 3,5,5-trimethylhexyl, isononanyl, isotridecyl, isomyristyl, isostearyl, 2-octyldodecyl triphenylmethyl, $C(O)—(CH_2)_5—C—(CH_3)_3$ (radical of neodecanoic acid), $C_{12}/C_{14}$alkyl, phenyl, cresyl, tert-butylphenyl or benzyl group, more preferably a 2-ethylhexyl, $C(O)—(CH_2)_5—C—(CH_3)_3—$ (radical of neodecanoic acid), $C_{12}/C_{14}$alkyl, phenyl, cresyl or tert-butylphenyl group, very preferably a tert-butylphenyl or 2-ethyl hexyl group, $R^{13}$, $R^{14}$=independently at each occurrence hydrogen and/or an organic radical, preferably alkyl, alkenyl, alkylidene, alkoxy, aryl and/or aralkyl groups, or else optionally $R^{13}$ and/or $R^{14}$ may be absent, and, if $R^{13}$ and $R^{14}$ are absent, there is a C=C double bond in place of the radicals $R^{13}$ and $R^{14}$ the bridging fragment Z may be present or absent, if the bridging fragment Z is absent, then $R^{15}$ and $R^{16}$=independently at each occurrence hydrogen and/or an organic radical, preferably alkyl, alkenyl, alkylidene, alkoxy, aryl and/or aralkyl groups, and, if one of the radicals $R^{13}$ or $R^{14}$ is absent, the respective geminal radical (i.e. $R^{15}$ if $R^{13}$ is absent and $R^{16}$ if $R^{14}$ is absent) is an alkylidene radical, preferably methylidene (=CH$_2$), if the bridging fragment Z is present, then $R^{15}$ and $R^{16}$=hydrocarbon radicals which are bridged cycloaliphatically or aromatically via the fragment Z, Z representing a divalent alkylene or alkenylene radical which may be further substituted, the fragment with the index y may be obtained, for example, by the incorporation of cyclic anhydrides; preferred cyclic anhydrides are succinic anhydride, maleic anhydride, itaconic anhydride, glutaric anhydride, adipic anhydride, citraconic anhydride, phthalic anhydride, hexahydrophthalic anhydride and trimellitic anhydride and also polyfunctional acid anhydrides such as pyromellitic dianhydride, benzophenone-3,3',4,4'-tetracarboxylic dianhydride, 1,2,3,4-butanetetracarboxylic dianhydride, or radically polymerized homopolymers or copolymers of maleic anhydride with ethylene, isobutylenes, acrylonitrile, vinyl acetate or styrene; particularly preferred anhydrides are succinic anhydride, maleic anhydride, itaconic anhydride, glutaric anhydride, adipic anhydride, citraconic anhydride, phthalic anhydride, hexahydrophthalic anhydride, where formula (Ib)

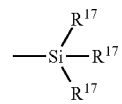

formula (Ib)

where $R^{17}$=independently at each occurrence a linear or branched, saturated or unsaturated, optionally further-substituted alkyl group having 1 to 30 carbon atoms, or an aryl or alkaryl group, preferably methyl, ethyl, octyl, decyl, dodecyl, phenyl, benzyl, more preferably methyl or ethyl, where formula (Ic):

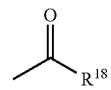

formula (Ic)

where $R^{18}$ independently at each occurrence is a divalent linear or cyclic, saturated or unsaturated alkyl group, which may be substituted, preferably a methyl, ethyl, propyl or isopropyl group, or an aryl group, preferably a phenyl group, or an at least disubstituted aryl group which may preferably carry at least one further carboxylic acid function, preferably acetate radical, propionate radical, phthalic acid radical, itaconic acid radical, hexahydrophthalic acid radical or maleic acid radical, and where the fragments D, T and Q stand for:

D is a polyether radical $-(D^A)_t D^X$ where t is 2,

T is a polyether radical $-(D^A)_t D^X$ where t is 3 and

Q is a polyether radical $-(D^A)_t D^X$ where t is 4, where $D^X$ is a t-valent functional, saturated or unsaturated, linear or branched organic hydrocarbon radical, which may contain O, S, Si and/or N as heteroatoms, with each of the radicals $D^A$ being covalently bonded to the radical $D^X$, the hydrocarbon radical preferably containing 8 to 1500 carbon atoms, the carbon chain of the hydrocarbon radical is preferably interrupted by oxygen atoms, the hydrocarbon radical preferably comprises silicon atom-containing substituents, the silicon atom-containing substituents are preferably alkoxysilyl groups, the hydrocarbon radical interrupted by oxygen atoms is preferably a polyoxyalkylene radical, polyether radical and/or polyetheralkoxy radical, or $D^X$ may be a singly or multiply fused phenolic group, or $D^X$ more preferably may be a t-valent radical of a t-times hydroxylated alcohol, polyetherol, polyesterol, siloxane, perfluorinated polyetherol, (poly)urethane or saccharide, preferably OH-functional polyethers, polyesters, polycarbonates, polyetheresters or perfluorinated polyethers and copolymers thereof, especially preferably OH-functional polyethers or polyesters, and where $D^A$ is a fragment of the formula (II)

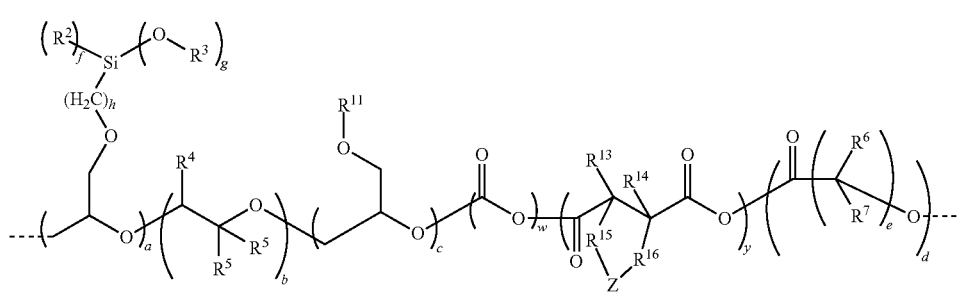

formula (II)

where a to h, w and y and $R^2$ to $R^{16}$ independently at each occurrence are defined as in formula (Ia),
with the proviso that the sum of all indices b in the formulae (Ia) and (II) is at least 1, preferably at least 2, especially preferably at least 3, and the sum of all indices a in the formulae (Ia) and (II) must be greater than or equal to 1.

In one particularly preferred embodiment, the polyether radicals D may be polyethers started with a dihydroxy-substituted compound; the polyether radicals T may be a polyether started with a trihydroxy-substituted compound; the polyether radicals Q may be polyethers started with a tetrahydroxy-substituted compound, and/or the fragment M may be a polyether started with a monohydroxy-substituted compound.

UR independently at each occurrence are identical or different divalent radicals of the form —U-$D^C$-U—,
or a monovalent radical of the form $D^D$-U—,
or a trivalent radical of the form $D^E U_3$,
or a trivalent radical of the form $D^F U_4$,
where U is a —O(O)—NH— group which is bonded via the nitrogen to $D^C$, $D^E$, $D^F$ and/or $D^D$ and $D^C$ independently at each occurrence is a divalent substituted or unsubstituted, linear or branched, saturated or unsaturated hydrocarbon radical having 1 to 30 carbon atoms, selected from alkyl, alkenyl, aryl or alkaryl radicals, and may optionally be interrupted by heteroatoms such as O, N and/or S, or is an aryl or alkaryl group; preferably $D^C$ is a divalent hydrocarbon radical having 6-30 carbon atoms, and especially preferably $D^C$ is an isophorone radical, $D^E$ independently at each occurrence is a trivalent substituted or unsubstituted, linear or branched, saturated or unsaturated hydrocarbon radical having 1 to 30 carbon atoms, selected from alkyl, alkenyl, aryl or alkaryl radicals, and may optionally be interrupted by heteroatoms such as O, N and/or S, and may optionally carry further functional groups, such as allophanate groups or biuret groups, for example, and $D^F$ independently at each occurrence is a tetravalent substituted or unsubstituted, linear or branched, saturated or unsaturated hydrocarbon radical having 1 to 30 carbon atoms, selected from alkyl, alkenyl, aryl or alkaryl radicals, and may optionally be interrupted by heteroatoms such as O, N and/or S, and may optionally carry further functional groups, such as allophanate groups or biuret groups, for example, and $D^D$ independently at each occurrence is a monovalent linear or branched, saturated or unsaturated hydrocarbon radical having 1 to 30 carbon atoms, selected from alkyl, alkenyl, aryl or alkaryl radicals, and may optionally be interrupted by heteroatoms such as O, N and/or S, and may also be further substituted, for example by alkyl-trialkoxysilane or alkyl-alkyldialkoxysilane groups, the hydrocarbon radical having preferably from 1 to 30, more preferably from 2 to 18 and very preferably from 3 to 10 carbon atoms, and more particularly a methyl, ethyl, propyl or butyl radical, 3-isocyanatopropyltrimethoxysilane, 3-isocyanatopropyltriethoxysilane; preferably $D^D$ is a monovalent hydrocarbon radical having 4-20 carbon atoms, more preferably methyl, ethyl, propyl, isopropyl, butyl, isobutyl, octyl, decyl, dodecyl, phenyl, tolyl, benzyl, isopropylphenyl or stearyl group, more preferably methyl, ethyl, propyl, isopropyl, butyl, phenyl, tolyl, isopropylphenyl or stearyl group; very preferably $D^D$ is a butyl radical.

AP independently at each occurrence are identical or different radicals of the general formula (IIIa), (IIIb) or (IIIc)

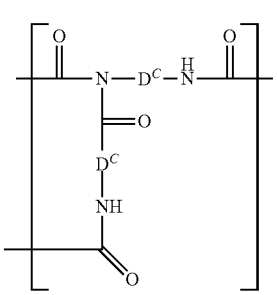

formula (IIIa)

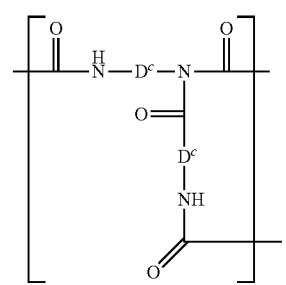

formula (IIIb)

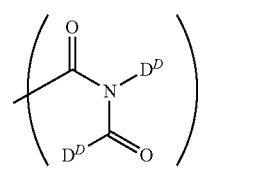

formula (IIIc)

The fragment UR may be termed a urethane unit. The fragment AP may be termed an allophanate unit.

Where polyisocyanates having the structural units $D^E$ and/or $D^F$ are used, the results are arbitrarily complex structures analogous to formula (IIIa) and/or (IIIb), and so a pictorial representation has deliberately been avoided. Instead, the skilled person can illustratively imagine that the three urethane units that are bonded to $D^E$ and/or the four urethane units that are bonded to $D^F$ are reacted further, all of them or some of them, to form allophanate structural units, as shown in the top part of the formulae (IIIa) and (IIIb).

The radical $R^{11}$ may carry further functional groups, such as, for example, (meth)acrylic acid and/or polymers of (meth)acrylic acid. Hydroxyl groups optionally present may therefore be esterified with acrylic acid and/or methacrylic acid. The double bonds of the (meth)acrylic acid are polymerizable, under radical induction for example, UV induction for example.

The polymerization of the (meth)acrylic groups may take place after the preparation of the polyether. It may also be carried out with the alkoxylation products of the invention, with the products of the process of the invention, and also after the inventive use.

The compositions of the invention with intrinsically reduced viscosity preferably comprise alkoxylation products (2) which comprise the structural elements of the formula (IIa), with $R^{27}$ resulting from the starter (2)

ably at least 3, and the sum of all indices a in the formula (IIa) must be greater than or equal to 1, and with the proviso that the various monomer units both of the fragments with the indices a, b, c, d and y may be constructed blockwise among one another, it also being possible for individual blocks to occur multiply and to be distributed statistically among one another, or else are subject to a statistical distribution and, moreover, are freely permutable among one another, in the sense of being for arrangement in any desired order, with the restriction that each group with the index y cannot follow itself, and where $R^{27}$=independently at each occurrence a saturated or unsaturated, linear or branched organic hydrocarbon radical which may contain O, S and/or N as heteroatoms; the hydrocarbon radical preferably contains 1 to 50 carbon atoms, preferably 2, 3 or 4 to 30 carbon atoms, the radicals $R^{27}$ preferably result from monovalent alcohols such as methanol, ethanol, propanol, isopropanol, butanol, isobutanol, tert-butanol, 2,2,4-trimethyl-1,3-pentanediol monoisobutyrate (Texanol from Exxon), octanol, 2-ethylhexanol, 2-propylheptanol, decanol, dodecanol, $C_{12}/C_{14}$ fatty alcohol, phenol, all constitutional isomers of cresol, benzyl alcohol, stearyl alcohol, more preferably butanol, 2,2,4-trimethyl-1,3-pentanediol monoisobutyrate (Texanol from Exxon), formula (IIa)

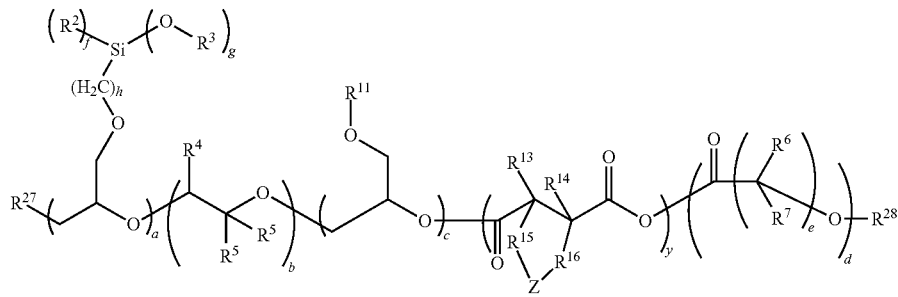

where
a=0 to 100, preferably 1 to 50, more preferably greater than 1 to 10, especially preferably 1 to 5,
b=0 to 200, preferably 1 to 100, more preferably greater than 2 to 50, especially preferably 3 to 30,
c=0 to 100, preferably 1 to 10, more preferably greater than 1 to 8, especially preferably 0 to 5,
d=0 to 100, preferably 1 to 10, more preferably greater than 1 to 8, especially preferably 0 to 5,
w=0 to 100, preferably 1 to 20, more preferably greater than 1 to 10, and especially preferably 0 to 7,
y=0 to 50, preferably 1 to 30, more preferably 2 to 20 and especially preferably 0 to 10,
e=1 to 10,
f=0 to 2
g=1 to 3
with the proviso that g+f=3
h=0 to 10, preferably 1 to 6, especially preferably 1, 2 or 3, with the proviso that the groups with the indices a, b, c, d and y are freely permutable over the molecule chain, it being disallowed for each group with the index y to follow itself,
with the proviso that the sum of all indices b in the formula (IIa) is at least 1, preferably at least 2, especially prefer- 2-ethylhexanol, allyl alcohol, 1-hexenol or 2-propylheptanol, more particularly butanol or allyl alcohol,
$R_{28}$=independently at each occurrence hydrogen or a fragment of the formulae (II) or (IIa) that is bonded via UR or AP.
$D^X$ is a t-valent functional, organic hydrocarbon radical. A feature of the functionality is that it is capable of initiating a ring-opening polymerization of alkylene oxides, of cyclic acid anhydrides and/or of acid lactones. In this sense it represents a starting compound for the alkoxylation to give the products of the invention, and, furthermore, characterizes not only the OH-functional starting compounds (1) but also the OH-functional starting compounds (2). The polymerization may optionally take place catalytically. Serving as catalysts may be acids, bases and metal atom-containing complexes. Preference is given to using what are called DMC catalysts. This reaction is subject to the common rules of addition that are known to the skilled person—for example, that the starter reacts preferentially on the side of the alkylene oxides that has the lower substitution, or on the carbonyl carbon of the lactones. This corresponds, in the case of the formula (II), to the left-hand side of the respective fragment of the formula.

The OH functions of the alkoxylation products (1) and (2) may, where desired, react with isocyanate functions to form urethanes. In the case of this reaction there are generally a series of side reactions (e.g. addition of an isocyanate group onto a urethane unit to give the allophanate group) whose extent can be controlled through the choice of the reaction conditions.

Preferred compositions of the invention with intrinsically reduced viscosity are those comprising alkoxylation products (1) of the formula (I) in which in each case the indices i and j independently at each occurrence are 1, 2, 3 or 4 and u=(j−1) to (j+1), and also k and l are zero. Especially preferred alkoxylation products of the invention with intrinsically reduced viscosity of the formula (I) are those in which t (starter (2))<t (starter (1)), since these alkoxylation products exhibit particularly outstanding fluidity and facilitate the preparation process to a particularly high degree, and/or alkoxylation products of the invention with intrinsically reduced viscosity, of the formula (I), in which other of the preferred parameters set out below are met:

Preferred are alkoxylation products with intrinsically reduced viscosity of the formula (I) where the indices in the formula (I) k and l=0, j=0 to 2, i=2, u=j+1 and v=0, a is in total greater than or equal to 2 and b is in total 3 to 300.

Additionally preferred are alkoxylation products with intrinsically reduced viscosity of the formula (I) where at least two alkoxylation products of the formula (I) are present, with in each case, independently at each occurrence, i, j, k or l being 1 and v and u being 0. Preferred, moreover, are alkoxylation products with intrinsically reduced viscosity of the formula (I) where the indices of the formula (I) are j=2, k, l, u and v=0 and i=1 to 4. The alkoxylation products (1) of the formula (I) of the invention, and especially the above-recited preferred embodiments of the alkoxylation products (1), are notable in that the viscosity of mixtures of the alkoxylation product (1) of the formula (I) with alkoxylation product (2) is lowered by at least 10%, preferably by at least 15%, more preferably by at least 20%, 30%, 40%, 50%, 60% or 70%, relative to the otherwise identical alkoxylation product (1) without addition of starter (2) during the alkoxylation.

Particularly preferred are alkoxylation products/polymers of the starters (1) $(H-D^A)_tD^X$, which with t=2 are dihydroxy-functional and are present in the product mixture alongside monohydroxy-functional polymers of starters (2) with t=1. Particularly preferred are mixtures of divalent polyethers $(H-D^A)_tD^X$ with t=2 and monovalent polymers based on starters (2) with t=1, which have been prepared from propylene oxide (PO) and 3-glycidyloxypropyltriethoxysilane (GLYEO) and optionally, additionally, ethylene oxide (EO) and/or glycidyl ethers. Especially preferred are alkoxylation products consisting of monohydroxy-functional polyethers based on dihydroxy-functional polyethers $(H-D^A)_tD^X$ where t=2 and starters (2) where t=1, which have been prepared exclusively from GLYEO and PO or exclusively from GLYEO, PO and EO.

The fragment $D^X$ of the starter (2) $(H-D^A)_tD^X$ where t=1 is preferably, independently at each occurrence, an OH-functional monovalent linear or branched, saturated or unsaturated hydrocarbon radical having 1 to 500 carbon atoms, preferably selected from alkyl, alkenyl, aryl or alkaryl radicals, which may optionally be interrupted by heteroatoms such as O, N and/or S and may also be further substituted, for example by acid ester, amide, alkyl-trialkoxysilane or alkyl-alkyldialkoxysilane groups, the hydrocarbon radical having preferably from 1 to 30, more preferably from 2 to 18 and very preferably from 3 to 12 carbon atoms.

The species in question is more preferably methanol, ethanol, propanol, isopropanol, butanol, isobutanol, tert-butanol, 2,2,4-trimethyl-1,3-pentanediol monoisobutyrate (Texanol from Exxon), octanol, 2-ethylhexanol, 2-propylheptanol, allyl alcohol, decanol, dodecanol, $C_{12}/C_{14}$ fatty alcohol, phenol, all constitutional isomers of cresol, benzyl alcohol, stearyl alcohol, more particularly butanol, 2,2,4-trimethyl-1,3-pentanediol monoisobutyrate (Texanol from Exxon), allyl alcohol, 2-ethylhexanol or 2-propylheptanol.

In one particular embodiment of the invention, the OH-functional hydrocarbon radical contains 7 to 100 carbon atoms, and the carbon chain of the hydrocarbon radical is preferably interrupted by oxygen atoms; the hydrocarbon radical interrupted by oxygen atoms is preferably a polyoxyalkylene radical, polyether radical and/or polyetheralkoxy radical, or else a polyester, polycarbonate or polyetherester radical, or mixtures of the aforementioned radicals.

The mono-hydroxy-functional compounds are preferably compounds having molar masses of 32 to 2000 g/mol, more preferably 50 to 1000 g/mol, more particularly 60 to 200 g/mol. These compounds can be used in any desired mixtures with one another or as pure substances. It is also possible to use hydroxyl compounds substituted pendently with substituents containing alkoxysilyl groups, or by alkoxysilyl groups directly, such as the silyl polyethers described in EP 2093244, as starters (2).

The preferably monohydroxy-functional compounds of the starter (2) are added to the ongoing alkoxylation process and hence may also be termed starting molecules, since the presence of the OH group in the molecule allows them to act as new chain starters for the synthesis of a polymer/polyether.

The fragment $D^X$ of the starter $(H-D^A)_tD^X$ where t is 2 is preferably a compound selected from low molecular mass compounds such as ethylene glycol, propylene glycol, di/triethylene glycol, 1,2-propylene glycol, di/tripropylene glycol, neopentyl glycol, 1,4-butanediol, 1,2-hexanediol and 1,6-hexanediol, trimethylolpropane monoethers or glycerol monoethers such as monoallyl ethers, for example, and also from high molecular mass compounds such as polyethylene oxides, polypropylene oxides, polyesters, polycarbonates, polycarbonate polyols, polyester polyols, polyetheresters, polyetherols, polyethercarbonates, polyamides, polyurethanes and sugar-based alkoxylates which may optionally have one or more alkoxysilyl group(s).

The fragment $D^X$ of the starter $(H-D^A)_tD^X$ where t is greater than 2 is preferably a compound selected from commercial sugar alcohols such as erythritol, xylitol and more particularly the hexavalent reduction products of the monosaccharides such as mannitol and sorbitol. Use may also be made, however, of compounds such as trimethylolpropane, di(trimethylol)ethane, di(trimethylol)propane, pentaerythritol, di(pentaerythritol), glycerol, di(glycerol) or polyglycerol, or else other compounds which are based on natural substances and carry hydroxyl groups, such as cellulose sugars or lignin, for example.

Preference is given to those compounds $D^X$ having at least one OH group and a melting point of less than 150° C.; more preferably, $D^X$ is OH-terminated and possesses a melting point of less than 100° C. and a molar mass between 500-8000 g/mol; especially preferred are starters $D^X$ which posses 2 to 6 OH-terminated ends, possess a melting point of less than 90° C. and possess a molar mass of 500-4000 g/mol. Preferred starters $D^X$ are hydroxyl-terminated polyethers which have been prepared by a reaction of ethylene oxide optionally in combination with propylene oxide. All said starters may also be used in any desired mixtures. Particularly preferred starters $D^x$ are hydroxyl-containing polyesters such as Desmophen® 1700 (Bayer), polyester polyols, such as Stepanpol® PS-2002 (Stepan Company), Priplast 1838 (Croda), and polycarbonates, as for example Oxymer® M112 (Perstorp), Desmophen® C1200 (Bayer), Desmophen® C2200 (Bayer), and also various dendritic OH-terminated polymers, such as Boltorn® H2004 (Perstorp), for example. Especially preferred starters are polypropylene glycols and polytetrahydrofurans (available in diverse molar weights as Terathane® (Invista) and PolyTHF® (BASF) e.g. PolyTHF 2000)).

Additionally particularly preferred are alkoxylation products of the invention which based on the individual molecule have on numerical average more than one alkoxysilyl group per group UR.

Additionally preferred are alkoxylation products of the invention of the formula (I) in which k, l and v are zero. Additionally preferred are alkoxylation products in which the index i is 2, the index j is 1 to 3 and the index u is 2 to 4.

In one especially preferred embodiment, the alkoxylation products (1) of the invention are of the formula (I) where i=2 to 10, preferably greater than 2 to 6, more preferably 2 j=0 to 6, preferably 1, 2, 3 or 4 k=0, 1 or 2, preferably 0
l=0, 1 or 2, preferably 0
u=(1*j)+(2*k)+(3*l)+1
v=0
where M conforms to formula (Ia) and/or formula (IIa) where
a=0 to 50, preferably 2 to 20, more preferably 1 to 4,
b=10 to 500, more preferably 12 to 400,
c=0 to 20, preferably 0 to 4
d=0 to 20, preferably 0
w=0 to 20, preferably 0
y=0 to 20, preferably 0,
e=1 to 10,
f=0 to 2
g=1 to 3
with the proviso that g+f=3
h=1, 2 or 3 and
$R^1$=independently at each occurrence a saturated or unsaturated, linear or branched organic hydrocarbon radical which may contain O, S and/or N as heteroatoms; the hydrocarbon radical contains preferably 1 to 400 carbon atoms, preferably 2, 3 or 4 to 200 carbon atoms, more preferably an alkyl radical having 2 to 12, preferably having 3 to 6, carbon atoms, more preferably a butyl radical,
$R^{27}$=independently at each occurrence a saturated or unsaturated, linear or branched organic hydrocarbon radical which may contain O, S and/or N as heteroatoms; the hydrocarbon radical preferably contains 1 to 50 carbon atoms, preferably 2, 3 or 4 to 30 carbon atoms,
the radicals $R^{27}$ result preferably from monovalent alcohols such as methanol, ethanol, propanol, isopropanol, butanol, isobutanol, tert-butanol, 2,2,4-trimethyl-1,3-pentanediol monoisobutyrate (Texanol from Exxon), octanol, 2-ethylhexanol, 2-propylheptanol, decanol, dodecanol, $C_{12}/C_{14}$ fatty alcohol, phenol, all constitutional isomers of cresol, benzyl alcohol, stearyl alcohol, more preferably butanol, 2,2,4-trimethyl-1,3-pentanediol monoisobutyrate (Texanol from Exxon), 2-ethylhexanol, allyl alcohol, 1-hexenol or 2-propyl-heptanol, more particularly butanol or allyl alcohol,
$R^{28}$=independently at each occurrence hydrogen or a fragment, bonded via UR or AP, of the formulae (II) or (IIa),
where for formula (II)
a=1 to 50, preferably greater than 1 to 20, more preferably 2 to 10, more particularly 0 to 6,
b=10 to 700, more preferably 12 to 350,
c=0 to 20, preferably 0
d=0 to 20, preferably 0
w=0 to 20, preferably 0
y=0 to 20, preferably 0,
e=1 to 10,
f=0 to 2
g=1 to 3
with the proviso that g+f=3
h=1, 2 or 3
and where for formula (Ia), (II) and formula (IIa) (radicals not explicitly stated here are as defined above)
$R^2$=independently at each occurrence a methyl or ethyl, propyl or isopropyl group, preferably a methyl or ethyl group
$R^3$=independently at each occurrence a methyl or ethyl, propyl or isopropyl group, preferably a methyl or ethyl group
$R^4$=independently at each occurrence hydrogen or a methyl, ethyl, octyl, decyl, dodecyl, phenyl or benzyl group, more preferably hydrogen or a methyl or ethyl group,
$R^5$=independently at each occurrence hydrogen, methyl or ethyl, especially preferably hydrogen,
$R^{11}$=independently at each occurrence an optionally substituted alkyl chain having 4 to 20 carbon atoms, preferably having 5 to 16 carbon atoms, more preferably having 6 to 12 carbon atoms, preferably selected from methyl, ethyl, propyl, butyl, isobutyl, tert-butyl, 2-pentyl, 3-pentyl, 2-methylbutyl, 3-methylbutyl, 2-methyl-2-butyl, 3-methyl-2-butyl, 2,2-dimethyl propyl, hexyl, heptyl, octyl, 2-ethylhexyl, 2-propylheptyl, 2-butyloctanyl, 2-methylundecyl, 2-propylnonyl, 2-ethyldecyl, 2-pentylheptyl, 2-hexyldecyl, 2-butyltetradecyl, 2-dodecylhexadecyl, 2-tetradecyloctadecyl, 3,5,5-trimethylhexyl, isononanyl, isotridecyl, isomyristyl, isostearyl, 2-octyldodecyl triphenylmethyl, $C(O)$—$(CH_2)_5$—$C$—$(CH_3)_3$— (radical of neodecanoic acid), $C_{12}/C_{14}$ alkyl, phenyl, cresyl, tert-butylphenyl or benzyl group, more preferably a 2-ethylhexyl, $C(O)$—$(CH_2)_5$—$C$—$(CH_3)_3$— (radical of neodecanoic acid), $C_{12}/C_{14}$ alkyl, phenyl, cresyl or tert-butylphenyl group, very preferably a tert-butylphenyl or 2-ethyl hexyl group,
and where for UR
UR independently at each occurrence are identical or different divalent radicals of the form
U-$D^C$-U—, where $D^C$ independently at each occurrence is a divalent substituted or unsubstituted, linear or branched, saturated or unsaturated hydrocarbon radical having 1 to 30 carbon atoms, $D^C$ being especially preferably an isophorone radical;
since compositions comprising these alkoxylation products (1) in combination with the alkoxylation products (2) exhibit a particularly outstanding fluidity and also facilitate the preparation process to an unusually high degree.

EP 2 093 244 describes how alkoxysilanes carrying epoxide functions can be selectively alkoxylated advantageously in the presence of known double metal cyanide catalysts. With the process claimed therein, the possibility is provided of performing in a reproducible manner the single and/or multiple alkoxysilyl group modification of polyoxyalkylene compounds not only terminally but also within the sequence of oxyalkylene units. The disclosure content of EP 2 093 244 is considered in full to be part of the present description.

Particularly preferred compositions of the invention are preparable by one of the processes specified below.

The present invention additionally provides a process for preparing compositions with intrinsically reduced viscosity, comprising alkoxylation products (1) and (2). Surprisingly now found has been the process for preparing alkyoxylation products (1) and (2), comprising the steps of
(a) reacting at least one starter (1) with at least one alkylene oxide and
(b) reacting at least one starter (2), different from starter (1), with at least one alkylene oxide,
where starters (1) and (2) are OH-functional compounds, preferably as defined above. Preferably, step b) takes place still during the ongoing alkoxylation of step a). Preferably, the addition of the starter (2) is made after the addition of the starter (1) is fully concluded. Large reductions in the viscosity are obtained in particular if starter (1) has a molar mass of greater than 400 g/mol and starter (2) has a molar mass of less than or equal to 400 g/mol. Surprisingly it has emerged that a particularly effective reduction in the viscosity can be achieved if the molar mass of starter (1) exceeds the molar mass of starter (2) by at least 200 g/mol, preferably by at least 600 g/mol, more preferably by at least 1000 g/mol. With particular preference the molar mass of starter (1) is at least twice as great as the molar mass of starter (2). Processes in which starters of these kinds are used are therefore particularly preferred.

The alkylene oxides in process step (a) are preferably ethylene oxide and/or propylene oxide and at least one epoxide carrying alkoxysilyl groups, and the alkylene oxides of process step (b) are preferably ethylene oxide and/or propylene oxide and optionally at least one epoxide carrying alkoxysilyl groups, and/or further monomers. Monomers are used preferably in the following fractions: 10 to 97 wt %, preferably 20 to 95 wt %, especially preferably 30 to 90 wt % of propylene oxide, 0 to 60 wt %, preferably 3 to 40 wt %, especially preferably 5 to 30 wt % of ethylene oxide, 0 to 25 wt %, preferably 0.5 to 15 wt %, especially preferably 1 to 10 wt % of epoxide carrying alkoxysilyl groups, and 0 to 25 wt %, preferably 0.1 to 20 wt %, especially preferably 0 to 10 wt % of further monomers, preferably selected from alkylene oxides other than propylene oxide and ethylene oxide, such as butylene oxide, isobutylene oxide, styrene oxide, and/or further comonomers such as ε-caprolactone, phthalic anhydride, glycidyl ethers such as tert-butylphenyl glycidyl ether, $C_{12}/C_{14}$ fatty alcohol glycidyl ethers and 2-ethylhexyl glycidyl ether, based on the total weight of the monomers used.

A preferred process for preparing alkoxylation products comprises the steps of
(a) reacting at least one starter (1) with 10 to 97 wt % of propylene oxide, 0 to 60 wt % of ethylene oxide, 0 to 25 wt % of alkoxysilylalkyl glycidyl ethers and 0 to 25 wt % of further monomers, based on the total weight of the monomers used
(b) reacting at least one starter (2) with 10 to 97 wt % of propylene oxide, 0 to 60 wt % of ethylene oxide, 0 to 25 wt % of alkoxysilylalkyl glycidyl ethers and 0 to 25 wt % of further monomers, based on the total weight of the monomers used.

A particularly preferred process, which is particularly advantageous for reducing the viscosity of the process products, is a process for preparing alkoxylation products that comprises the steps of
(a) reacting at least one starter (1) with at least one alkylene oxide and
(b) reacting at least one starter (2), different from starter (1), with at least one alkylene oxide,
where starters (1) and (2) are OH-functional compounds, preferably as defined above, with the starter (1) having a higher OH functionality, in other words more OH groups, than the starter (2); more preferably the starter (1) has t OH groups and starter (2) has t–1 OH groups, where t=2 to 8, preferably 2 to 5, more preferably 2, 3 or 4, and more particularly 2.

The products of the invention are preferably obtainable via an alkoxylation process using double metal cyanide catalysts (DMC catalysts) and dihydroxy-functional compounds, such as, for example, polyethers $(H-D^4)_t D^X$ where t=2 as starters (1) and also monohydroxy-functional compounds, such as, for example, low molecular alcohols with t=1, as starters (2).

The alkoxylation products of the invention are preferably obtainable by subjecting such starters to addition reaction with at least one glycidyl ether of the general formula (V)

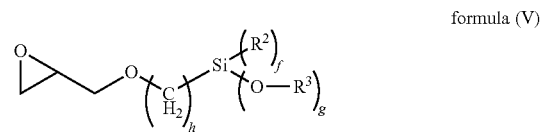

formula (V)

where
f=0 to 2
g=1 to 3
with the proviso that g+f=3 and g is at least 1,
h=0 to 10 and
$R^2$=independently at each occurrence an alkyl group having 1 to 8 carbon atoms,
$R^3$=independently at each occurrence an alkyl group having 1 to 8 carbon atoms,
and at least one further polymerizable monomer, preferably selected from alkylene oxides, glycidyl ethers, lactones, cyclic dicarboxylic anhydrides and mixtures thereof, more particularly alkylene oxides, very preferably monomers which in the completed product lead to fragments with the index b, c, d, w and/or y, especially preferably fragments with the index b, of the formulae (Ia), (II) and (IIa), with one another in such a way that the starter or starters (2) are present not together with starter (1) at the beginning of the reaction, but are instead added together with one or more of the aforementioned monomers during the ongoing alkoxylation.

Examples of alkylene oxide compounds which can be used and which lead to the fragments with the index b specified in the formulae (Ia), (II) and (IIa) are ethylene oxide, 1,2-epoxypropane (propylene oxide), 1,2-epoxy-2-methylpropane (isobutylene oxide), epichlorohydrin, 2,3-epoxy-1-propanol, 1,2-epoxybutane (butylene oxide), 2,3-epoxybutane, 2,3-dimethyl-2,3-epoxybutane, 1,2-epoxypentane, 1,2-epoxy-3-methylpentane, 1,2-epoxyhexane, 1,2-epoxycyclohexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, vinylcyclohexene oxide, (2,3-epoxypropyl)benzene, vinyloxirane, 3-phenoxy-1,2-epoxypropane, 2,3-epoxy methyl ether, 2,3-epoxy ethyl ether, 2,3-epoxy isopropyl ether, 3,4-epoxybutyl stearate, 4,5-epoxypentyl acetate, 2,3-epoxypropane methacrylate, 2,3-epoxypropane acrylate, glycidyl butyrate, methyl glycidate, ethyl 2,3-epoxybutanoate, 4-(trimethylsilyl)butane 1,2-epoxide, 4-(triethylsilyl)butane 1,2-epoxide, 3-(perfluoromethyl)-1,2-epoxypropane, 3-(perfluoroethyl)-1,2-epoxypropane, 3-(perfluorobutyl)-1,2-epoxypropane, 3-(perfluorohexyl)-1,2-epoxypropane, 4-(2,3-epoxypropylmorpholine, 1-(oxiran-2-ylmethyl)pyrrolidin-2-one. Preference is given to using ethylene oxide, propylene oxide and butylene oxide. Particular preference is given to using ethylene oxide and propylene oxide.

A non-exhaustive collection of lactones which through ring opening lead to the fragments with the index d, specified in the formulae (Ia), (II) and (IIa), are valerolactones or caprolactones, both of which may be unsubstituted or substituted by alkyl groups, preferably methyl groups. Preference is given to using ε-caprolactone or δ-valerolactone, especially ε-caprolactone.

Saturated, unsaturated or aromatic cyclic dicarboxylic anhydrides used, leading to the fragments with the index a through reactive incorporation, are preferably succinic anhydride, oct(en)yl-, dec(en)yl- and dodec(en)ylsuccinic anhydride, maleic anhydride, itaconic anhydride, phthalic anhydride, hexahydro-, tetrahydro-, dihydro-, methylhexahydro- and methyltetrahydrophthalic anhydride. During the alkoxylation process, the respective anhydride monomers may be copolymerized in any order and in any variable amount, in succession or in temporal parallel with the epoxide feed, with ring opening, to form polyether esters. Mixtures of the stated anhydrides can also be used. It is possible, furthermore, to add the anhydrides to the starter $D^X$ before the beginning of reaction, and to forgo a metered addition as described above. An alternative possibility, however, is both to add the anhydrides to the starter $D^X$ and to meter in further anhydride in the course of the further reaction, during the alkoxylation.

Particularly preferred for use are succinic anhydride, maleic anhydride, phthalic anhydride and hexahydrophthalic anhydride, especially maleic anhydride and hexahydrophthalic anhydride.

Glycidyl ethers which lead to the fragments with the index c, specified in the formulae (Ia), (II) and (IIa), conform to the general formula (IV)

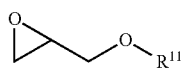

formula (IV)

where $R^{11}$ is as defined above,
$R^{11}$ conforms preferably to a methyl, ethyl, isobutyl, tert-butyl, hexyl, octyl, 2-ethylhexyl, C(O)—(CH$_2$)$_5$—C—(CH$_3$)$_3$ (radical from neodecanoic acid, available for example as Cardura E 10 P from Momentive), $C_{12}/C_{14}$, phenyl, cresyl or tert-butylphenyl group and/or an allyl group, more preferably an ally, cresyl, 2-ethylhexyl, —C(O)—(CH$_2$)$_5$—C—(CH$_3$)$_3$ or $C_{12}/C_{14}$ group. Employed with particular preference are 2-ethylhexyl glycidyl ether (available for example as Grilonit RV 1807, Grilonit RV 1807 4.1 or IPDX RD 17) and $C_{12}$-$C_{14}$-glycidyl ether (available for example as Ipox® RD 24).

As glycidyl ethers which can be used also include polyfunctional glycidyl ethers such as 1,4-butanediol diglycidyl ether, 1,6-hexanediol diglycidyl ether, cyclohexanedimethanol diglycidyl ether, neopentyl glycol diglycidyl ether, polyethylene glycol diglycidyl ether, polypropylene glycol diglycidyl ether, polyglycerol-3 glycerol ether, glycerol triglycidyl ether, trimethylolpropane triglycidyl ether or pentaerythritol tetraglycidyl ether, whereby branched structural elements as well can be introduced into the final alkoxylation product of the formulae (I), in accordance with the formulae (Ia), (II) and (IIa).

Depending on the epoxide-functional alkoxysilane used and on any further monomers employed, modified alkoxylation products of formula (I) can be prepared, and also mixtures of any desired construction.

Alkylene oxide compounds which may be used and which lead to the fragments with the index a, specified in the formulae (Ia), (II) and (IIa), may conform to the general formula (V)

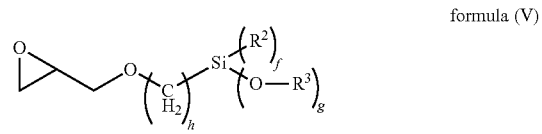

formula (V)

where f, g, h, $R^2$ and $R^3$ are as defined above.

A non-exhaustive collection of alkoxysilanes with epoxide groups substitution, of formula (V), encompasses, for example, 3-glycidyloxypropyltrimethoxysilane, 3-glycidyloxypropyltriethoxysilane, 3-glycidyloxypropyltripropoxysilane, 3-glycidyloxypropyltriisopropoxysilane, bis(3-glycidyloxypropyl)dimethoxysilane, bis(3-glycidyloxypropyl)diethoxysilane, 3-glycidyloxyhexyltrimethoxysilane, 3-glycidyloxyhexyltriethoxysilane, 3-glycidyloxypropylmethyldimethoxysilane, 3-glycidyloxypropylethyldiethoxysilane.

Used preferably in the process of the invention as compounds of the formula (V) are 3-glycidyloxypropyltrimethoxysilane or triethoxysilane, which are available, for example, under the trade names DYNASYLAN® GLYMO and DYNASYLAN® GLYEO respectively (trademarks of Evonik Degussa GmbH). Particularly preferred is the use of glycidyloxypropyltriethoxysilane, since in this way it is possible to prevent emissions of methanol in application as moisture-crosslinking components.

The compounds which furnish the radical $R^1$ of the formula (Ia) are understood for the purposes of the present invention to be substances which can be the end group of the final alkoxylation product with intrinsically reduced viscosity.

The radical $R^1$ originates preferably from a hydroxy-containing compound of the formula (VI)

formula (VI)

where $R^1=R^X$—O— and $R^X$=organic radical which can have further OH groups and may optionally have one or more alkoxysilyl groups, and in which, therefore, the hydrogen shown in formula (VI) is part of the hydroxyl group. Employed with preference are compounds having molar masses of 31 to 10 000 g/mol, more preferably 50 to 2000 g/mol, more particularly 60 to 200 g/mol These compounds can be used in any desired mixtures with one another or as pure substances. It is also possible to use hydroxyl compounds substituted pendently by substituents containing alkoxysilyl groups, or by alkoxysilyl groups directly, such as the silyl polyethers described in EP 2093244, as starter compounds.

In one particular embodiment of the present invention it may be possible to use the compounds of the type $R^1$—H as starters (2) during the alkoxylation, resulting in the formation of alkoxylation products, particularly of the formula (Ia), which are obtained by the inventive addition reaction of epoxide-functional monomers and possibly further cornonomers.

The compound of the formula $R^1$—H used in the process of the invention is preferably selected from the group of alcohols, polyetherols or phenols. Employed with preference as starter compound is a mono- or polyhydric polyether alcohol or other alcohol. Employed with preference are mono- to tetrahydric polyether alcohols or other alcohols. Employed with more particular preference are monohydric polyether alcohols or other alcohols. Used advantageously are low molecular mass polyetherols having molar masses of 50 to 2000 g/mol, which have in turn been prepared beforehand by DMC-catalysed alkoxylation.

Suitability is possessed not only by compounds having aliphatic and cycloaliphatic OH groups, but also by any desired compounds having OH functions. These include, for example, phenol, alkylphenols and arylphenols.

As di- to tetra-OH-functional starters (1) and (2), preferably $(H-D^4)_tD^X$ where $t=2$ to 4, it is preferred to use compounds having molar masses of 62 to 10 000 g/mol, preferably 92 to 7000 g/mol, more preferably 122 to 5000 g/mol and, for starters (1), especially preferably 2000 to 4000 g/mol. The starter compounds can be used in any desired mixtures with one another or as pure substances. It is also possible to use hydroxyl compounds substituted pendently by substituents containing alkoxysilyl groups, or by alkoxysilyl groups directly, such as the silyl polyethers described in EP 2093244, as starter compounds. Starter compounds used advantageously are low molecular mass polyetherols having molar masses of 62 to 4000 g/mol, which have in turn been prepared beforehand by DMC-catalysed alkoxylation.

As well as compounds with aliphatic and cycloaliphatic OH groups, any desired compounds with OH functions are suitable. These include, for example, phenol, alkylphenols and arylphenols, or else carbohydrates such as saccharides, for example; in particular, Bisphenol A and novolaks are suitable starter compounds.

The average molar masses $M_w$, of the alkoxylation products of the unit or units D as per formula (I) are preferably between 4000 to 50 000 g/mol, preferably between 8000 and 20 000 g/mol and more preferably from 10 000 to 16 000 g/mol. The alkoxylation products of the formula (I) are preferably liquid at room temperature.

The hydrophilicity/hydrophobicity of the moieties M, D, T, Q in the alkoxylation products of the invention may be adjusted through the choice of suitable starter molecules and/or of suitable comonomers for the alkoxylation.

The alkoxylation products of the invention can be obtained in a variety of ways. The alkoxylation products of the invention are prepared preferably by the process of the invention that is described below.

The alkoxylation products of the formula (I) are notable in that in terms of structural make-up and molar mass they can be produced in a targeted and reproducible way. The sequence of the monomer units may be varied within wide limits. Epoxide monomers may be incorporated in arbitrarily blocklike fashion arrayed with one another or statistically into the polymer chain. The sequence of the fragments inserted into the resultant polymer chain through the ring-opening reaction of the reaction components is freely permutable among the fragments, in the sense of a possibility for arrangement in any desired order, with the restriction that cyclic anhydrides and also carbon dioxide are inserted statistically, in other words not in homologous blocks, in the polyether structure, and also not directly adjacent to one another.

The index numbers reproduced here and the value ranges for the indices indicated in the formulae shown here are therefore understood as average values of the possible statistical distribution of the structures and/or mixtures thereof that are actually present. This applies even to those structural formulae which as such, per se, are reproduced exactly, such as for formula (Ia) and/or (II) and/or (IIa), for example.

Depending on the epoxide-functional alkoxysilane used and any further monomers employed, and also any carbon dioxide, it is possible to obtain ester-modified or carbonate-modified alkoxysilyl polyethers. The alkoxysilyl unit in the compound of the formulae (Ia), (II) and (IIa) is preferably a trialkoxysilyl unit, more particularly triethoxysilyl unit.

As shown by $^{29}$Si NMR and GPC investigations, the process-related presence of chain-end OH groups means that transesterification reactions on the silicon atom are possible not only during the DMC-catalysed preparation but also, for example, in a subsequent process step. In that case, formally, the alkyl radical $R^3$ bonded to the silicon via an oxygen atom is replaced by a long-chain, modified alkoxysilyl polymer radical. Bimodal and multimodal GPC plots demonstrate that the alkoxylation products include not only the untransesterified species, as shown in formula (I), but also those with twice, in some cases three times, or even four times the molar mass. Formula (I) therefore provides only a simplified representation of the complex chemical reality.

The alkoxylation products therefore constitute mixtures, which may also include compounds in which the sum of the indices f+g in the formulae (Ia), (II) and (IIa) is on average less than 3, since some of the OR groups may be replaced by silyl polyether groups. The compositions therefore comprise species which are formed on the silicon atom with elimination of $R^3$—OH and condensation reaction with the reactive OH group of a further molecule of the formulae (Ia) and/or (II) and/or (IIa). This reaction may proceed multiply until, for example, all of the $R^3O$ groups on the silicon have been replaced by further molecules of the formulae (Ia) and/or (II) and/or (IIa). The presence of more than one signal in typical $^{29}$Si NMR spectra for these compounds underlines the occurrence of silyl groups with different substitution patterns.

The stated values and preference ranges for the indices a, b, c, d, e, f, g, h, i, j, k, l, m, n, o, p, q, r, s, t, u, v, w, x and y in the compounds of the formulae (I), (Ia), (II) and (IIa) should therefore be understood as average values across the various, individually intangible species. The diversity of chemical structures and molar masses is also reflected in the broad molar mass distributions of $M_w/M_n$ of mostly ≥1.5, which are typical for alkoxylation products of the formula (I) and entirely unusual for conventional DMC-based polyethers.

Inseparably connected with the process for alkoxylation of epoxy-functional alkoxysilanes that is set out in EP 2 093 244 is the feature that on the chain terminus or on the chain termini there is always an OH functionality, originating from the epoxide ring opening of the last respective epoxide monomer, with attachment to the OH-functional end of the growing chain.

In EP 2415796 (US 2012/028022) and the as yet unpublished patent application DE 10 2012 203737, an objective was to allow the lowering of the reactivity of the OH group in hydroxyl-terminated alkoxylation products of the formula (I) which do not exclusively carry terminal alkoxysilyl groups. Here it was possible to show that through the reduction in the reactivity of the OH groups, it is possible to achieve massive improvements in the storage stability and also the elongation at break of the cured/polymerized alkoxysilylated alkoxylation product. This was achievable through the introduction of endcapping on the hydroxyl group at the chain end of the prepolymer.

The products of the invention can be prepared in a variety of ways, in particular by processes which follow the processes described in EP 2 093 244, EP 2415796 (US 2012/028022) or EP 2415797 (US 2012/029090). The alkoxylation products of the invention are preferably prepared by the process of the invention as described below.

A process preferred in accordance with the invention for preparing an alkoxylation product of the invention with intrinsically reduced viscosity, as per formula (I), is notable in that at least one starting molecule $(H-D^4)_tD^X$ where t is greater than or equal to 2 is reacted with at least one glycidyl ether of the general formula (V) and optionally with at least one alkylene oxide in such a way that temporarily, in the course of the alkoxylation, at least one starter (2) with t greater than or equal to 1 is also added.

The preferably monohydroxy-functional starter (2) are added to the ongoing alkoxylation process, comprising starter (1), preferably in the presence of a double metal cyanide catalyst, and accordingly can also be termed starting molecules, since because of the presence of the OH group in the molecule, they are able to act as a new chain starter for the construction of a polymer/polyether. As a result, alkoxylation products with significantly reduced viscositiy are obtained. This is all the more surprising since the skilled person expected no change in the product, owing to the so-called "catch-up" behaviour of DMC catalysts.

The process of the invention for preparing an alkoxylation product of the invention with intrinsically reduced viscosity may preferably consists of up to two process steps. In process step A, an alkoxylation reaction is preferably carried out which can be carried out in two or more stages, followed optionally by a process step B, a so-called endcapping reaction.

Process Step a):

In process step A, a DMC-catalysed alkoxylation of a starter (1) with compounds containing epoxide groups (alkylene oxides and glycidyl ethers) is carried out, in the course of which reaction starters (2) are also added.

In order to start the alkoxylation reaction according to the process of the invention, the starting mixture, consisting of one or more OH-functional starters (1) $D^X$ and the double metal cyanide catalyst, which optionally has been suspended beforehand in a suspension medium, is charged to the reactor.

Suspension media utilized may be either a polyether or inert solvents or else, advantageously, one or more starting compounds, or alternatively a mixture of both components.

Propylene oxide or at least one other epoxide compound is metered into the starting mixture introduced. To start the alkoxylation reaction and to activate the double metal cyanide catalyst, usually first of all only some of the total amount of epoxide to be metered is added. The molar ratio of epoxide to the reactive groups in the starter, more particularly to the OH groups in the starting mixture, is in the starting phase preferably between 0.1:1 to 10:1, preferably between 0.2:1 to 5:1, preferably between 0.4:1 to 3:1. It may be advantageous if, before the epoxide is added, any reaction-inhibiting substances that may be present are removed from the reaction mixture, by means of distillation, for example, optionally under reduced pressure. The starting of the exothermic reaction may be detected, for example, by monitoring of pressure and/or of temperature. A sudden drop in pressure in the reactor is an indicator, in the case of gaseous alkylene oxides, that the alkylene oxide is being incorporated, the reaction has therefore started, and the end of the starting phase has been reached. In the case of non-gaseous glycidyl ethers/esters or epoxide-functional alkoxysilanes, the onset of the reaction is indicated by the enthalpy change which occurs.

After the starting phase, in other words after initialization of the reaction, either one or more starters (2) and further alkylene oxide at the same time, or only further alkylene oxide, are metered in, depending on the target molar mass. An alternative possibility is to add on an arbitrary mixture of different alkylene oxide compounds and compounds of the formulae (IV) and (V), which may also be added on separately in any order in succession.

For reduction in viscosity of the reaction mixture, for example, the reaction may be carried out in an inert solvent. Suitable inert solvents include hydrocarbons, especially toluene, xylene or cyclohexane. This, however, is less preferred.

In the products of the invention, the molar ratio of the sum of the metered epoxides, including the epoxides already added in the starting phase, based on the starting compound employed, more particularly based on the number of OH groups in the starting compound employed, is preferably 1 to $10^5$:1, more particularly 1 to $10^4$:1. The addition of the alkylene oxide compounds occurs preferably at a temperature of 60 to 250° C., more preferably at a temperature of 90 to 160° C. The pressure at which the alkoxylation takes place is preferably 0.02 bar to 100 bar, more preferably 0.05 to 20 bar and more particularly from 0.2 to 2 bar absolute. By carrying out the alkoxylation at sub-atmospheric pressure it is possible to implement the reaction very safely. The alkoxylation may optionally be carried out in the presence of an inert gas (e.g. nitrogen) or—for the preparation of polyethercarbonates—in the presence of carbon dioxide, also at a super-atmospheric pressure of in that case preferably 1 to 20 bar absolute.

The cyclic anhydrides or lactones which can be used for the preparation of ester-modified polyethers may be added not only in the actual starting phase to the mixture of starter (1) and catalyst, but also at a later point in time, in parallel with the alkylene oxide feed. The stated comonomers may also each be metered in succession, in alternation with alkylene oxides, into the reactor.

The molar ratio of the alkylene oxide monomers to cyclic anhydrides in that case is variable. Typically at least equimolar amounts of alkylene oxide monomers are used, based on anhydrides. Preference is given to using the alkylene oxides in a molar excess, in order to ensure full conversion of anhydride.

Lactones may be added during the alkoxylation alternatively in a stoichiometric deficit or excess, based on the alkylene oxide monomers.

The addition of starters (2) here may take place within wide limits in terms of concentration, nature and number of the compounds, and nature of the reaction regime, thereby providing the user with great flexibility.

For instance, the metered addition of starters (2) may take place once at any defined point in time, or else a number of times in portions at a number of points in time. The total amount of starter (2) in this case may be divided evenly over the desired number of portions, though it is also possible to divide the total amount into different-sized portions.

As well as the above-described discontinuous addition of starters (2), the addition may also be continuously. In that case, the continuous addition may be carried out once during the alkoxylation reaction, or a number of times. Starters (2) are preferably added continuously. With more particular preference, starters (2) are added once, and continuously.

It is advantageous, furthermore, if the metering of the starters (2) is ended before the total amount of alkylene oxides or glycidyl ethers of the formula (IV) and/or (V) has been added to the reaction mixture, since in this way it is possible to ensure quantitative conversion of the starters (2) to form compounds of the formulae (IIa). The metering rate of the starter (2) as well may be varied within a wide frame according to the corresponding requirements, without adversely affecting the properties of the product mixtures of formula (I).

Where two or more different starters (2) are added to the reaction mixture, it is possible to mix the compounds prior to metering and then to add them as a mixture, continuously or discontinuously; it is also possible, however, to supply all starters (2) separately, continuously or discontinuously to the reaction mixture. In this case it is possible, moreover, first to add the first starter (2) and then, in a second portion, to add a different starter (2). If further steps of addition are desired, it is possible subsequently to add the first starter (2) again and in this way—if the second compound then follows again—to realize, so to speak, an alternating addition protocol; however, any other starter (II) may also be added in one or more portions.

The concentration of the metered starters (2) in relation to the molar amount of the starter (1) employed can also be varied within wide limits. Hence the molar ratio of all of the starting molecules (1) used to all of the starters (2) added is preferably between 1:0.001 and 0.001:1, more preferably between 1:0.01 and 0.01:1, and especially preferably between 1:0.1 and 0.1:1.

The functionality of the starters (1) and (2) employed, or the value of t in the starters $(H-D^4)_t$-$D^X$, is freely selectable within wide limits. Preferably t (starter (1)) is >=t (starter (2)). In one particularly advantageous embodiment of the invention, t (starter (1)) is >t (starter (2)). It is especially preferred if t (starter (1)) is greater by 1 than t (starter (2)).

Following the monomer addition and possible afterreaction to complete the monomer conversion, any residues of unreacted monomer and possibly further volatile constituents are removed, typically by vacuum distillation, gas stripping or other deodorization methods. Volatile secondary components may be removed both discontinuously (batchwise) and continuously. In the process of the invention on the basis of DMC catalysis it is normally unnecessary to carry out filtration.

The process steps may be performed at identical or different temperatures. The mixture of starting substance, DMC catalyst and optionally suspension medium that is charged to the reactor at the start of the reaction may be pretreated by stripping in accordance with the teaching of WO 98/52689 before monomer metering is commenced. In that case, via the reactor supply line, an inert gas is admixed to the reaction mixture, and more volatile components are removed from the reaction mixture by application of subatmospheric pressure, with the aid of a vacuum system connected to the reactor system. In this simple way, substances which can inhibit the catalyst, such as lower alcohols or water, for example, can be removed from the reaction mixture. The addition of inert gas and the simultaneous removal of the more volatile components may be advantageous particularly during run-up/starting of the reaction, since the addition of the reactants, or secondary reactions, may also cause inhibiting compounds to enter the reaction mixture.

Double metal cyanide catalysts (DMC catalysts) used in the process of the invention are preferably those described in EP 2 093 244, more particularly the DMC catalysts described therein as preferred and particularly preferred, respectively.

The catalyst concentration in the reaction mixture is preferably >0 to 1000 wppm (mass ppm), preferably >0 to 500 wppm, more preferably 0.1 to 300 wppm and very preferably 1 to 200 wppm. This concentration is based on the total mass of the alkoxylation products formed.

The catalyst is preferably metered only once into the reactor. The amount of catalyst is to be set such as to provide sufficient catalytic activity for the process. The catalyst may be metered as a solid or in the form of a catalyst suspension. If a suspension is used, then a particularly suitable suspension medium is the starter $D^X$. Preferably, however, there is no suspending.

It may be advantageous if process step A of the process of the invention is carried out such that the alkoxylation is carried out in at least three stages. In stage 1, the starter (1) is reacted with a small amount of propylene oxide in the presence of the DMC catalyst as described above. Subsequently, further propylene oxide is added on, with the consequent and preferred development of at most of a molar mass of 500 to 10 000 g/mol, and more preferably of at most 1000 to 3000 g/mol, in addition to the starter used.

In stage 2, further propylene oxide and/or ethylene oxide are/is added, with addition of at least one starter (2) and optionally of one or more of the abovementioned glycidyl ethers of the formula (IV); in stage 3, one or more of the compounds of the formula (V) is or are added, optionally with further addition of propylene oxide and/or ethylene oxide; stages 2 and 3 may also be combined to form one stage.

In one particular embodiment of the claimed process, however, it is also possible to combine the above-described stages 2 and 3 and at the same time to meter in at least one starter (2) together with one or more of the compounds of the formula (V), optionally with further addition of propylene oxide and/or ethylene oxide. In another preferred embodiment of the claimed process it is also possible, before stage 3, to introduce an extra stage 2b, in which exclusively alkylene oxides, preferably propylene oxide and/or ethylene oxide, optionally together with glycidyl ethers of the formula (IV), are metered in.

By adding on a mixture of compound of the formula (V) and propylene oxide in stage 3, the alkoxysilane functionality is introduced randomly over the polymer chains/polymer blocks. The sequences in which stages 2 and 3 are carried out is arbitrary. Preferably, after stage 1, stage 2 is carried out first, before stage 3 is carried out. Stages 2 and 3 may be carried out multiply in succession. If stages 2 and 3 are carried out for a number of times, the alkylene oxides used, and also the components of the formulae (IV) and (V) and the starter (2), may be the same or different. The detailed process description above serves merely for better illustration, and represents a preferred metering sequence of the reactants. It must not be used to imply any strictly blockwise construction of the alkoxylation products of the invention with reduced viscosity.

Stage 1 is carried out preferably at a temperature of 70-160° C., more preferably at 80-150° C., very preferably at a temperature of 100-145° C., especially preferably at 110-130° C. Stage 2 is carried out preferably at a temperature of 70-160° C., more preferably at 80-150° C., very preferably at a temperature of 100-145° C., especially preferably at 110-130° C. Stage 3 is carried out preferably at a temperature of 70-140° C., more preferably at 75-120° C., very preferably at a temperature of 80-110° C. If stages 2 and 3 are combined, the reaction temperature should be adapted to the temperature preferred under stage 3.

Process Step b):

It may be advantageous if subsequently a process step B is carried out, in which the terminal OH group or groups in the alkoxylation product is or are reacted in such a way that there is no longer any free OH group.

In one preferred embodiment of process step B, the reaction may be carried out with silanol formers or monoisocyanates, preferably with a monoisocyanate, as described in patent application EP 2415797 (US 2012/029090).

Suitable monoisocyanates which can be used are, at their most simple, alkyl, aryl and arylalkyl isocyanates. Preference may be given to using methyl, ethyl, butyl, hexyl, octyl, dodecyl and stearyl isocyanate, with butyl isocyanate being especially preferred.

Particularly suitable monofunctional isocyanates are also those which in turn carry crosslinkable alkoxysilyl groups in the molecule. These include, preferably, isocyanatoalkyl-trialkoxysilanes and isocyanatoalkyl-alkyldialkoxysilanes.

Suitable alkoxysilane-functional monoisocyanates used may be isocyanatotrimethoxysilane, isocyanatomethyltriethoxysilane, (isocyanatomethyl)methyldimethoxysilane, (isocyanatomethyl)methyldiethoxysilane, 3-isocyanatopropyltrimethoxysilane, 3-isocyanatopropylmethyldimethoxysilane, 3-isocyanatopropyltriethoxysilane and 3-isocyanatopropylmethyl-diethoxysilane. The use of 3-isocyanatopropyltrimethoxysilane and -triethoxysilane is preferred here.

Another particularly preferred embodiment of process step B for preparing the alkoxylation products of the invention with intrinsically reduced viscosity, of the formula (I), is notable in that in a first reaction step (a) polyethers of the formula (PE) are reacted with diisocyanates, and in a second reaction step (b), the product/product mixture from the first reaction step (a) is reacted with a molecule of the formula H-M. The polyethers of the formula PE have been described above. The molecules of the formula H-M are compounds containing hydrogen bonded to the fragment M, which has been described above.

Preferably, in the process of the invention, the diisocyanates are used in a molar excess over the OH groups of the polyethers resulting from t starter (1) plus t (starter 2), i.e. t starter (1)+t (starter 2)<c(diisocyanate).

In another particularly preferred embodiment of process step B for preparing the alkoxylation products of the invention with intrinsically reduced viscosity of the formula (I), the aim is for a quantitative conversion not only of the terminal OH functions of the polyether but also of the isocyanate groups of the polyisocyanates. According to this reaction principle, therefore, dimers, trimers or tetramers of the alkoxysilyl polyether fragments M may be constructed via a corresponding polyisocyanate, depending on the number of isocyanate groups in the polyisocyanate.

In the particularly preferred embodiment of reaction step (b) of process step B of the process of the invention, moreover, the alkoxylation products (1) and (2) are selected such that the product includes more alkoxysilyl groups than groups UR.

The two reactions (a) and (b) are preferably carried out separately from one another in terms of time. In this case, preferably, the alkoxylation products (1) and (2) are first reacted with the diisocyanates. In this step, the stoichiometric proportions determine the number of UR fragments in the product. In the second reaction step (b), the unreacted isocyanate groups are reacted preferably with the molecule H-M. If starter (2) is a starter having only one OH group, H-M may preferably be alkoxylation product (2).

The reaction with the molecule H-M corresponds to an endcapping process. The aim with this reaction step is to cause preferably all of the isocyanate groups to be consumed by reaction.

Process step B of the process of the invention for preparing alkoxysilyl compounds of formula (I) is carried out preferably with isophorone diisocyanate in the presence of a transition metal catalyst, and is described in detail in the as yet unpublished patent application DE 10 2012 203737. In principle, however, all known isocyanates are suitable as compounds containing isocyanate groups. Within the context of the teaching according to the invention, preference is given, for example, to aromatic, aliphatic and cycloaliphatic polyisocyanates having a number-average molar mass of below 800 g/mol. Suitable accordingly, for example, are diisocyanates from the series 2,4-/2,6-toluene diisocyanate (TDI), methyldiphenyl diisocyanate (MDI), triisocyanatononane (TIN), naphthyl diisocyanate (NDI), 4,4'-diisocyanatodicyclohexyl methane, 3-isocyanatomethyl-3,3,5-trimethylcyclohexyl isocyanate (isophorone diisocyanate=IPDI), tetramethylene diisocyanate, hexamethylene diisocyanate (HDI), 2-methylpentamethylene diisocyanate, 2,2,4-trimethyl-hexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanatodicyclohexylpropane(2,2), 3-isocyanatomethyl-1-methyl-1-isocyanatocyclohexane (MCI), 1,3-diisooctylcyanato-4-methylcyclohexane, 1,3-diisocyanato-2-methylcyclohexane and α,α,α',α'-tetramethyl-m- or -p-xylylene diisocyanate (TMXDI), and mixtures consisting of these compounds.

Preferred diisocyanates used for preparing the alkoxylation products of formula (I) may be hexamethylene diisocyanate (HDI), isophorone diisocyanate (IPDI) and/or 4,4'-diisocyanatodicyclohexylmethane; in particular, isophorone diisocyanate (IPDI) may preferably be used. Likewise suitable as isocyanate-containing starting components are reaction products of the aforementioned isocyanates with themselves or with one another to form uretdiones or isocyanurates. Examples include Desmodur® N3300, Desmodur® N3400 or Desmodur® N3600 (all BayerMaterialScience, Leverkusen, Del.). Also suitable, furthermore, are derivatives of isocyanates, such as allophanates or biurets. Examples include Desmodur® N100, Desmodur® N75MPA/BA or Desmodur® VPLS2102 (all BayerMaterialScience, Leverkusen, Del.).

The specifications EP 2415797 (US 2012/029090), have disclosure content in relation to the processes disclosed therein that is hereby regarded in full as being part of the present specification.

It may be advantageous if process step B is carried out such that >20 wt %, preferably >50 wt % and more preferably >75 wt % of the alkoxylation products obtained no longer have a free OH group.

The alkoxylation products of the invention may be used, for example, for producing curable compositions.

A feature of curable compositions of the invention is that they comprise one or more of the above-described alkoxylation products of the invention, of the formula (I), and at least one curing catalyst.

It may be advantageous if the composition of the invention comprises only alkoxylation products of the formula (I) with i=2, j=1 to 4, k=0, l=0, u=(j+1) and v=0 to 4 as defined above, and no alkoxylation products of the formula (I) in which i=0, j=1, k=0, l=0, u=0 and v=0.

It may also be advantageous, however, if the composition of the invention comprises not only alkoxylation products of the formula (I) with i=1 to 2, j=1 to 4, k=0, l=0, u=(j+1) and v=0 to 4, as defined above, but also alkoxylation products of the formula (I) in which i=0, j=1, k=0, l=0, u=0 and v=0. Where both kinds of alkoxylation products are present in the composition of the invention, the mass ratio (ratio of the parts by mass) of alkoxylation products of the formula (I) with i=1 to 2, j=1 to 4, k=0, l=0, u=(j+1) and v=0 to 4 to alkoxylation products of the formula (I) in which i=0, j=1, k=0, l=0, u=0 and v=0 is from 100:>0 to 10:90, preferably between 95:5 and 15:85 and more preferably between 80:20 and 30:70. Preferably, the alkoxylation products of the formula (I) in which i=0, j=1, k=0, l=0, u=0 and v=0 also have ethoxysilyl groups, preferably triethoxysilyl groups, predominantly or exclusively, preferably exclusively, as their alkoxysilyl groups.

It may, however, also be advantageous if the composition of the invention comprises not only alkoxylation products of the formula (I) where i=1 to 4, j=0, k=0, l=0, u=1 and v=0 to 2, as defined above, but also alkoxylation products of the formula (I) in which i=1, j=0, k=0, l=0, u=0 and v=0. Where both kinds of alkoxylation products are present in the composition of the invention, the mass ratio (ratio of the parts by mass) of alkoxylation products of the formula (I) with i=1 to 2, j=0, k=0, l=0, u=1 and v=0 to 4 to alkoxylation products of the formula (I) in which i=1, j=0, k=0, l=0, u=0 and v=0 is from 100:>0 to 10:90, preferably between 95:5 and 15:85 and more preferably between 80:20 and 30:70. Preferably, the alkoxylation products of the formula (I) in which i=0, j=1, k=0, l=0, u=0 and v=0 also have ethoxysilyl groups, preferably triethoxysilyl groups, predominantly or exclusively, preferably exclusively, as their alkoxysilyl groups.

The fraction of the alkoxylation products of the invention in the composition of the invention is preferably from 10 to less than 90 wt %, preferably from 15 to 70 wt % and more preferably from 20 wt % to 65 wt %.

Curing catalysts used (for the crosslinking or polymerization of the composition of the invention or for the chemical attachment thereof to particle surfaces or macroscopic surfaces) may be the catalysts typically employed for the hydrolysis and condensation of alkoxysilanes. Curing catalysts employed with preference are organotin compounds, such as, for example, dibutyltin dilaurate, dibutyltin diacetylacetonate, dibutyltin diacetate, dibutyltin dioctoate, or dioctyltin dilaurate, dioctyltin diacetylacetonate, dioctyltin diketanoate, dioctylstannoxane, dioctyltin dicarboxylate, dioctyltin oxide, preferably dioctyltin diacetylacetonate, dioctyltin dilaurate, dioctyltin diketanoate, dioctylstannoxane, dioctyltin dicarboxylate, dioctyltin oxide, more preferably dioctyltin diacetylacetonate and dioctyltin dilaurate. Also used, furthermore, may be zinc salts, such as zinc octoate, zinc acetylacetonate and zinc-2-ethylcaproate, or tetraalkylammonium compounds, such as N,N,N-trimethyl-N-2-hydroxypropylammonium hydroxide, N, N, N-trimethyl-N-2-hydroxypropylammonium 2-ethylhexanoate or choline 2-ethylhexanoate. Preference is given to the use of zinc octoate (zinc 2-ethylhexanoate) and of the tetraalkylammonium compounds, particular preference to that of zinc octoate. Use may further be made of bismuth catalysts as well, e.g. Borchi® catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides and also aluminium acetylacetonate, calcium compounds such as calcium disodium ethylenediamine tetraacetate or calcium diacetylacetonate, or else amines, e.g. triethylamine, tributylamine, 1,4-diazabicyclo[2.2.2]octane, 1,8-diazabicyclo[5.4.0]undec-7-ene, 1,5-diazabicyclo[4.3.0]non-5-ene, N,N-bis(N,N-dimethyl-2-aminoethyl)methylamine, N, N-dimethylcyclohexylamine, N, N-dimethylphenylamine, N-ethylmorpholine etc. Organic or inorganic Brønsted acids as well, such as acetic acid, trifluoroacetic acid, methanesulphonic acid, p-toluenesulphonic acid or benzoyl chloride, hydrochloric acid, phosphoric acid, its monoesters and/or diesters, such as butyl phosphate, (iso)propyl phosphate, dibutyl phosphate, etc., for example, are suitable as catalysts. It is of course also possible to employ combinations of two or more catalysts.

The fraction of the curing catalysts in the composition of the invention is preferably from 0.1 wt % to 5 wt %, more preferably from 0.15 to 2 wt % and very preferably from 0.2 to 0.75 wt %, based on the overall composition.

The composition of the invention may comprise further adjuvants selected from the group of plasticizers, fillers, solvents, adhesion promoters, additives for modifying the flow behaviour, known as rheology additives, and drying agents, more particularly chemical moisture-drying agents.

The composition of the invention preferably comprises one or more adhesion promoters and/or one or more drying agents, more particularly chemical moisture-drying agents.

As adhesion promoters it is possible for the adhesion promoters known from the prior art, more particularly aminosilanes to be present in the composition of the invention. Adhesion promoters which can be used are preferably compounds which carry alkoxysilyl groups and which additionally possess primary or secondary amine groups, vinyl groups, thio groups, aryl groups or alternatively oxirane groups, such as 3-aminopropyltrimethoxysilane (Dynasylan® AMMO (Evonik)), N-(2-aminoethyl)-3-aminopropyltrimethoxysilane (Dynasylan® DAMO (Evonik)), N-(n-butyl)aminopropyltrimethoxysilane (Dynasylan® 1189 (Evonik)), 3-mercaptopropyltrimethoxysilane (Dynasylan® MTMO, Evonik), 3-glycidyloxypropyltriethoxysilane (Dynasylan® GLYEO, Evonik) 3-glycidyloxypropyltrimethoxysilane (Dynasylan® GLYMO, Evonik), phenyltrimethoxysilane (Dynasylan® 9165 or Dynasylan® 9265, Evonik) or oligomeric amino/alkyl-alkoxysilanes such as, for example, Dynasylan® 1146 (Evonik), in each case alone or in a mixture. Adhesion promoters preferably present are, for example, 3-aminopropyltriethoxysilane (Geniosil® GF 93 (Wacker), Dynasylan® AMEO (Evonik®)) and/or (3-aminopropyl)methyldiethoxysilane (Dynasylan® 1505 (Evonik®)), 3-aminopropyltrimethoxysilane (Dynasylan® AMMO (Evonik)), N-(2-aminoethyl)-3-aminopropyltrimethoxysilane (Dynasylan® DAMO (Evonik)), Dynasylan® 1146 (Evonik), more preferably 3-aminopropyltriethoxysilane, 3-aminopropyltrimethoxysilane, N-(2-aminoethyl)-3-aminopropyltrimethoxysilane, Dynasylan® 1146, and especially preferably 3-aminopropyltrimethoxysilane, 3-aminopropyltriethoxysilane, N-(2-aminoethyl)-3-aminopropyltrimethoxysilane and Dynasylan® 1146.

The fraction of the adhesion promoters in the composition of the invention is preferably from greater than 0 to 5 wt %, more preferably from 0.5 to 4 wt % and very preferably from 1 to 2.5 wt %, based on the overall composition.

It may be advantageous if the composition of the invention comprises a drying agent, in order, for example to bind moisture or water introduced by formulation components, or incorporated subsequently by the filling operation or by storage. Drying agents which can be used in the compositions of the invention are in principle all of the drying agents known from the prior art. Chemical drying agents which can be used include, for example, vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker), vinyltriacetoxysilane (Geniosil® GF 62, Wacker), N-trimethoxysilylmethyl-O-methyl-carbamate (Geniosil® XL 63, Wacker), N-dimethoxy(methyl)silylmethyl-O-methyl-carbamate, N-methyl[3-(trimethoxysilyl) propyl]carbamate (Geniosil® GF 60, Wacker), vinyldimethoxymethylsilane (Geniosil® XL 12, Wacker), vinyltris(2-methoxyethoxy)silane (Geniosil® GF 58, Wacker), bis(3-triethoxysilylpropyl)amine (Dynasylan® 1122, Evonik), bis (3-trimethoxysilylpropyl)amine (Dynasylan® 1124), N-dimethoxy(methyl)silylmethyl-O-methyl-carbamate (Geniosil® XL 65, Wacker) or oligomeric vinylsilanes such as, for example, Dynasylan® 6490 and Dynasylan® 6498 (both acquirable from Evonik) alone or in a mixture. Preference is given to using vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker) as drying agents. As a chemical moisture-drying agent, the composition of the invention comprises preferably vinyltrimethoxysilane (Dynasylan® VTMO, Evonik or Geniosil® XL 10, Wacker AG). Furthermore, in addition to or as an alternative to the chemical drying, a physical drying agent may be used, such as zeolites, molecular sieves, anhydrous sodium sulphate or anhydrous magnesium sulphate, for example.

The fraction of the drying agent in the composition of the invention is preferably from greater than 0 to 5 wt %, more preferably from 0.2 to 3 wt %, based on the overall composition.

The composition of the invention may comprise one or more adjuvants selected from the group of plasticizers, fillers, solvents and additives for adapting the flow behaviour (rheology additives).

The plasticizers may for example be selected from the group of the phthalates, the polyesters, alkylsulphonic esters of phenol, cyclohexanedicarboxylic esters, or else of the polyethers. Plasticizers used are only those compounds which are different from the alkoxylation products of the invention of the formula (I).

If plasticizers are present in the composition of the invention, the fraction of the plasticizers in the composition of the invention is preferably from greater than 0 wt % to 90 wt %, more preferably 2 wt % to 70 wt %, very preferably 5 wt % to 50 wt %, based on the overall composition.

Fillers which can be used are, for example, precipitated or ground chalk, inorganic carbonates in general, precipitated or ground silicates, precipitated or fumed silicas, glass powders, hollow glass beads (known as bubbles), metal oxides, such as $TiO_2$, $Al_2O_3$, for example, natural or precipitated barium sulphates, reinforcing fibres, such as glass fibres or carbon fibres, long or short fibre wollastonites, cork, carbon black or graphite. With advantage it is possible to use hydrophobized fillers, since these products exhibit lower introduction of water and improve the storage stability of the formulations.

If fillers are present in the composition of the invention, the fraction of the fillers in the composition of the invention is preferably from 1 to 70 wt % based on the overall composition, with concentrations of 30 to 65 wt % being particularly preferred for the fillers stated here, with the exception of the fumed silicas. If fumed silicas are used, a particularly preferred fumed silica fraction is from 2 to 20 wt %.

As rheology additives, preferably present in addition to the filler, it is possible to select from the group of the amide waxes, acquirable for example from Cray Valley under the brand name Crayvallac®, hydrated vegetable oils and fats, fumed silicas, such as Aerosil® R202 or R805 (both acquirable from Evonik) or Cab-O-Sil® TS 720 or TS 620 or TS 630 (sold by Cabot), for example. If fumed silicas are already being used as a filler, there may be no need to add a rheology additive.

If rheology additives are present in the composition of the invention, the fraction of the rheology additives in the composition of the invention, depending on the desired flow behaviour, is preferably from greater than 0 wt % to 10 wt %, more preferably from 2 wt % to 6 wt %, based on the overall composition.

The compositions of the invention may comprise solvents. These solvents may serve, for example, to lower the viscosity of the uncrosslinked mixtures, or may promote flow onto the surface. Solvents contemplated include in principle all solvents and also solvent mixtures. Preferred examples of such solvents are ethers such as, tert-butyl methyl ether, esters, such as ethyl acetate or butyl acetate or diethyl carbonate, and also alcohols, such as methanol, ethanol and also the various regioisomers of propanol and of butanol, or else glycol types, which are selected according to the specific application. Furthermore, aromatic and/or aliphatic solvents may be employed, including halogenated solvents as well, such as dichloromethane, chloroform, carbon tetrachloride, hydrofluorocarbons (FREON), etc., and also inorganic solvents such as, for example, water, $CS_2$, supercritical $CO_2$ etc.

As and when necessary, the compositions of the invention may further comprise one or more substances selected from the group encompassing co-crosslinkers, flame retardants, deaerating agents, antimicrobial and preservative substances, dyes, colorants and pigments, frost preventatives, fungicides and/or reactive diluents and also complexing agents, spraying assistants, wetting agents, fragrances, light stabilizers, radical scavengers, UV absorbers and stabilizers, especially stabilizers against thermal and/or chemical exposures and/or exposures to ultraviolet and visible light.

UV stabilizers used may be, for example, known products based on hindered phenolic systems. Light stabilizers used may be, for example, those known as HALS amines. Stabilizers which may be used include, for example, the products or product combinations known to the skilled person and made up for example of Tinuvin®-stabilizers (Ciba), such as Tinuvin®stabilizers (Ciba), for example Tinuvin® 1130, Tinuvin® 292 or else Tinuvin® 400, preferably Tinuvin® 1130 in combination with Tinuvin® 292. The amount in which they are used is guided by the degree of stabilization required.

In addition, the curable compositions may be admixed with co-crosslinkers in order to boost mechanical hardness and reduce the propensity to flow. Such co-crosslinkers are typically substances capable of providing 3, 4 or more crosslinkable groups. Examples in the context of this invention are 3-aminopropyltriethoxysilane, tetramethoxysilane or tetraethoxysilane.

Preferred compositions of the invention comprise at least one alkoxylation product of the formula (I) and a plasticizer, a filler, an adhesion promoter, a drying agent or a (curing) catalyst.

Particularly preferred compositions of the invention have from 10 to 90 wt % or less than 80 wt %, based on the overall composition, of alkoxylation product of the formula (I), which preferably has an average of between 2.0 and 8.0 ethoxysilyl functions per alkoxylation product of the formula (I), from 0.3 wt % to 5.0 wt %, preferably from 0.5 wt % to 4.0 wt % and more preferably from 1.0 wt % to 2.5 wt % based on the overall composition of adhesion promoter, less than 30 wt % based on the overall composition of plasticizer, with the mass ratio of alkoxylation product of the formula (I) to plasticizer being more preferably less than 1.1 times that of the alkoxylation product of the formula (I), from 1 to 70 wt % based on the overall composition of fillers, from 0.2 to 3.0 wt % based on the overall composition of chemical moisture-drying agents, and from 0.1 wt % to 5.00 wt %, preferably 0.2 to 3.00 wt % and more particularly 0.1 to 5 wt % based on the overall composition of curing catalysts. In the case of especially preferred compositions, the stated fractions of the formulation ingredients are selected such that the sum total of the fractions adds up to 100 wt %.

The compositions of the invention may be, for example, adhesives or sealants, or may be used for producing an adhesive or sealant.

The composition of the invention, more particularly the composition of the invention thus obtained, cures within time periods comparable with existing commercially available and industrially employed products, and also undergoes very good depthwise crosslinking if applied in relatively thick films. The flank adhesion and attachment to different substrates, such as steel, aluminium, various plastics and mineral substrates, such as stone, concrete and mortar, for example, are particularly good.

The compositions of the invention may be used in particular for reinforcing, levelling, modifying, adhesively bonding, sealing and/or coating of substrates. Suitable substrates are, for example, particulate or sheetlike substrates, in the construction industry or in vehicle construction, structural elements, components, metals, especially construction materials such as iron, steel, including stainless steel, and cast iron, ceramic materials, especially based on solid metal oxides or non-metal oxides or carbides, aluminium oxide, magnesium oxide or calcium oxide, mineral or organic substrates, especially cork and/or wood, mineral substrates, chipboard and fibreboard made from wood or cork, composite materials such as, for example, wood composite materials such as MDF boards (medium-density fibreboard), WPC articles (wood plastic composites), chipboard, cork articles, laminated articles, ceramics, and also natural fibres and synthetic fibres (and substrates comprising them), or mixtures of different substrates. With particular preference the compositions of the invention are used in the sealing and/or coating of particulate or sheetlike substrates, in the construction industry or in vehicle construction, for the sealing and adhesive bonding of structural elements and components, and also for the coating of porous or non-porous, particulate or sheetlike substrates, for the coating or modification of surfaces and for applications on metals, particularly on construction materials such as iron, steel, including stainless steel, and cast iron, for application on ceramic materials, especially based on solid metal oxides or non-metal oxides or carbides, aluminium oxide, magnesium oxide or calcium oxide, on mineral substrates or organic substrates, especially on cork and/or wood, for the binding, reinforcement and levelling of uneven, porous or fractious substrates, such as for example, mineral substrates, chipboard and fibreboard made from wood or cork, composite materials such as, wood composites such as MDF boards (medium-density fibreboard), WPC articles (wood plastic composites), chipboard, cork articles, laminated articles, ceramics, but also natural fibres and synthetic fibres, or mixtures of different substrates.

As a result of this broad spectrum of adhesion, they are also suitable for the bonding of combinations of materials comprising the substrates stated. In this context it is not critical whether the surfaces are smooth or roughened or porous. Roughened or porous surfaces are preferred, on account of the greater area of contact with the adhesive.

The compositions of the invention are applied preferably in a temperature range of 10° C.-40° C. and also cure effectively under these conditions. In view of the moisture-dependent curing mechanism, a relative atmospheric humidity of min. 35% to max. 75% is particularly preferred for effective curing. The cured adhesive bond (composition) can be used within a temperature range of −10° C. to 80° C. The adhesive bonds produced with the compositions of the invention are resistant to water at T<60° C. and to non-swelling solvents. The adhesive bond is not resistant to solvents which swell the formulation, such as methanol, ethanol, toluene, tetrahydrofuran, acetone or isopropanol, for example.

Swellability by ethanol, which is formed during the crosslinking reaction of the alkoxylation products, is a fundamental prerequisite, since the ethanol formed does not hinder curing even within large, extensive bonds. It is transported away to the edges, where it evaporates. Accordingly, rapid curing of the extensive bond is ensured with the formulations of the invention.

The examples listed below illustrate the present invention by way of example, without any intention of restricting the invention, the scope of application of which is apparent from the entirety of the description and the claims, to the embodiments specified in the examples.

EXAMPLES

General Details

The viscosity was determined shear rate-dependently at 25° C. with the MCR301 rheometer from Anton Paar in a plate/plate arrangement with a gap width of 1 mm. The diameter of the upper plate was 40 mm. The viscosity at a shear rate of 10 s$^{-1}$ was read off and is set out in tables 2 and 3.

Example 1

Synthesis of a PPG-Based, Alkoxysilyl-Functional Polyether—Used for Non-Inventive Formulations (Comparative Example)

A 5 liter autoclave was charged with 353 g of PPG 2000, and 150 ppm (based on the total batch) of a zinc hexacyanocobaltate double metal cyanide catalyst were added. For inertization, the reactor was charged with nitrogen up to 3 bar and let down to atmospheric pressure. The operation was repeated twice more. With stirring, the contents of the reactor were heated to 130° C. and evacuated to approximately 20 mbar in order to remove volatile components. After 30 minutes, the catalyst was activated by the metered introduction into the evacuated reactor of 80 g of propylene oxide. The internal pressure rose initially to about 0.8 bar. After about 6 minutes, the reaction set in, this being noticeable through a drop in the reactor pressure. Then 1218 g of propylene oxide were metered in continuously over the course of about 50 minutes. A one-hour afterreaction ensued, during which the temperature was lowered to 95° C. At this temperature, a mixture of 196 g of Dynasylan® GLYEO (from Evonik) and 1233 g of propylene oxide was metered in continuously at a rate such that the temperature remained constant. After a further one-hour afterreaction, the batch was deodorized by application of a pressure (P<100 mbar), in order to remove residues of unreacted alkylene oxide. Then 500 ppm of Irganox® 1135 (from BASF) were stirred in for 15 minutes. A colourless, highly viscous product was obtained. The respective molar ratios of the reactants employed, relative to 1 mol of starter, can be seen in table 2.

Examples 2-15, 18 and 19

Synthesis of Alkoxysilyl-Functional Polyethers with Intrinsically Reduced Viscosity (Examples 2-7, 11 and 13-15 Inventive, Examples 8-10, 12, 18 and 19 Comparative Examples)

The syntheses were carried out as for Example 1, with the target product being synthesized by addition of three blocks onto the respective starting molecule. After the addition of the first block, which was synthesized from PO as an alkylene oxide, and after a 30-minute afterreaction, a second block followed, in which a mixture of PO and the respective starter (2) was metered in. Completed metering was followed by a one-hour afterreaction.

In the final third block, the addition took place of a mixture of Dynasylan® GLYEO and PO, followed by a one-hour afterreaction time. The two first blocks were added at 130° C., the third block at 95° C. Finally, the reaction mixture was degassed at 95° C. for 15 minutes, and 500 ppm of antioxidant (Irganox® 1135) were stirred in. The molar ratios of the reactants employed, relative to 1 mol of starter, can be seen in table 2.

Examples 16 and 17

Synthesis of Alkoxysilyl-Functional Polyethers (not Inventive)

The syntheses were carried out as for Example 1, with the starter and the amounts used being adapted correspondingly, in order to ensure the construction documented in table 1.

TABLE 1

Construction of the silyl polyethers of Examples 16 and 17

| | | 1. | 2. | 3. | |
|---|---|---|---|---|---|
| Ex. | Starter (1) | $n_{PO}$ [mol] | $n_{PO}$ [mol] | $n_{GLYEO}$ [mol] | $n_{PO}$ [mol] |
| 16 | PPG 2000* | 18 | 46 | 2.67 | 68.67 |
| 17 | BPG 400** | 0 | 17.5 | 1.33 | 34.33 |

*Polypropylene glycol polyether with an average molecular weight of 2000 g/mol
**Butanol-started polypropylene glycol with an average molar mass of 400 g/mol Example 20

Preparation of a Polymer Mixture of Silyl Polyethers of Examples 16+17, in Order to Prepare a Silyl Polyether Analogously to Example 2 (Comparative Example)

A mixture of the silyl polyethers of Examples 16 and 17 in a molar ratio of 2:1 is prepared. This is done by adding 438 g of polyether from Example 17 to 2524 g of polyether from Example 16 in a 4 L glass flask, homogenizing the mixture at room temperature by stirring for 30 minutes, and then determining the viscosity. The viscosity at 25° C. was 4.6 Pas.

TABLE 2

Construction and viscosity of the alkoxysilyl polyethers of Examples 1-15 and 18-20

| | | | 1. | 2. | | 3. | | Viscosity |
|---|---|---|---|---|---|---|---|---|
| Ex. | Starter (1) | Starter (2) | $n_{PO}$ [mol] | $n_{PO}$ [mol] | $n_{Starter\,(2)}$ [mol] | $n_{GLYEO}$ [mol] | $n_{PO}$ [mol] | [Pas] (at 25° C.) |
| 1 | PPG 2000* | — | 87 | 0 | 0 | 4 | 103 | 12.1 |
| 2 | PPG 2000* | 1-Butanol | 18 | 69 | 0.5 | 4 | 103 | 4.2 |
| 3 | PPG 2000* | Texanol | 18 | 69 | 0.5 | 4 | 103 | 4.3 |
| 4 | PPG 2000* | 2-Propyl-1-heptanol | 18 | 69 | 0.5 | 4 | 103 | 4.2 |
| 5 | PPG 2000* | 2-Propyl-1-heptanol | 37 | 50 | 0.5 | 4 | 103 | 3.9 |
| 6 | PPG 2000* | 2-Ethyl-1-hexanol | 18 | 69 | 0.25 | 4 | 103 | 5.1 |
| 7 | PPG 2000* | 2-Ethyl-1-hexanol | 18 | 69 | 0.8 | 4 | 103 | 3.0 |
| 8 | PPG 2000* | Dipropylene glycol | 18 | 69 | 0.25 | 4 | 103 | 8.6 |
| 9 | PPG 2000* | Dipropylene glycol | 18 | 69 | 0.5 | 4 | 103 | 7.3 |
| 10 | PPG 2000* | Glycerol | 18 | 69 | 0.5 | 4 | 103 | 7.0 |
| 11 | PPG 2000* | BPG 400** | 18 | 69 | 0.5 | 4 | 103 | 4.1 |
| 12 | PPG 2000* | PPG 2000* | 18 | 69 | 0.25 | 4 | 103 | 8.4 |
| 18 | Desmophen C 2200+ | — | 106 | 0 | 0 | 4 | 84 | 79.1 |
| 13# | Desmophen C 2200+ | 1-Butanol | 18 | 0 | 0.5 | 4 | 120 | 46.7 |
| 14 | Desmophen C 2200+ | 1-Butanol | 18 | 69 | 0.5 | 4 | 103 | 37.5 |
| 19 | Baycoll AD 2055++ | — | 121 | 0 | 0 | 4 | 84 | 29.8 |

TABLE 2-continued

Construction and viscosity of the alkoxysilyl polyethers of Examples 1-15 and 18-20

| | | | 1. | 2. | | 3. | | Viscosity |
|---|---|---|---|---|---|---|---|---|
| Ex. | Starter (1) | Starter (2) | $n_{PO}$ [mol] | $n_{PO}$ [mol] | $n_{Starter\,(2)}$ [mol] | $n_{GLYEO}$ [mol] | $n_{PO}$ [mol] | [Pas] (at 25° C.) |
| 15 | Baycoll AD 2055[++] | 1-Butanol | 18 | 69 | 0.5 | 4 | 119 | 11.9 |
| 20 | | | 2:1 mixture of Examples 16 + 17 | | | | | 4.6 |

*Polypropylene glycol polyether with an average molecular weight of 2000 g/mol
**Butanol-started polypropylene glycol with an average molar mass of 400 g/mol
[+]terminally dihydroxy-functional polycarbonate with an average molecular weight of 2000 g/mol (available from Bayer Material Science)
[++]terminally dihydroxy-functional polyester with an average molecular weight of 2000 g/mol (available from Bayer Material Science)
[#]In Example 13, after the 1st block, initially in block 2a, 0.5 mol of 1-butanol alone was metered in, and in a subsequent block 2b a mixture of 30.6 mol of EO and 27.7 mol of PO was metered in. Lastly, the block 3 documented in table 2 was added on accordingly.

Endcapping (Method According to DE 102012203737):

The alkoxylation products prepared in Examples 1-12 and 20 were subsequently reacted using IPDI according to process A.

The alkoxylation products prepared in Examples 1, 13-15, 18 and 19 were subsequently reacted using IPDI in accordance with process B.

Examples according to process A:

Example 21

706.8 g of silyl polyether from Example 1 were introduced and heated to 60° C. Then 26.68 g of IPDI were added, the mixture was stirred for five minutes, and 0.8 g of TIB Kat 722 was added. The mixture was stirred for 45 minutes and heated to 80° C. and 53.5 g of polyether of the general formula $C_4H_9O[CH_2CH(CH_3)O]_{5.6}H$ were added. This was followed by stirring for a further 3 hours.

Example 22

2541 g of silyl polyether from Example 2 were introduced and heated to 60° C. Then 96 g of IPDI were added, the mixture was stirred for five minutes, and 2.83 g of TIB Kat 722 (bismuth carboxylate) were added. The mixture was stirred for 30 minutes and heated to 80° C. and 192 g of polyether of the general formula $C_4H_9O[CH_2CH(CH_3)O]_{5.6}H$ were added. This was followed by stirring for a further 5 hours.

Example 23

2544 g of silyl polyether from Example 3 were introduced and heated to 60° C. Then 95 g of IPDI were added, the mixture was stirred for five minutes, and 2.83 g of TIB Kat 722 (bismuth carboxylate) were added. The mixture was stirred for 45 minutes and heated to 80° C. and 191 g of polyether of the general formula $C_4H_9O[CH_2CH(CH_3)O]_{5.6}H$ were added. This was followed by stirring for a further 3 hours.

Example 24

2556 g of silyl polyether from Example 4 were introduced and heated to 60° C. Then 96 g of IPDI were added, the mixture was stirred for five minutes, and 2.84 g of TIB Kat 722 (bismuth carboxylate) were added. The mixture was stirred for 45 minutes and heated to 80° C. and 192 g of polyether of the general formula $C_4H_9O[CH_2CH(CH_3)O]_{5.6}H$ were added. This was followed by stirring for a further 3 hours.

Example 25

2550 g of silyl polyether from Example 5 were introduced and heated to 60° C. Then 96 g of IPDI were added, the mixture was stirred for five minutes, and 2.83 g of TIB Kat 722 (bismuth carboxylate) were added. The mixture was stirred for 45 minutes and heated to 80° C. and 191 g of polyether of the general formula $C_4H_9O[CH_2CH(CH_3)O]_{5.6}H$ were added. This was followed by stirring for a further 3 hours.

Example 26

2497 g of silyl polyether from Example 6 were introduced and heated to 60° C. Then 94 g of IPDI were added, the mixture was stirred for five minutes, and 2.78 g of TIB Kat 722 (bismuth carboxylate) were added. The mixture was stirred for 45 minutes and heated to 80° C. and 189 g of polyether of the general formula $C_4H_9O[CH_2CH(CH_3)O]_{5.6}H$ were added. This was followed by stirring for a further 3 hours.

Example 27

2538 g of silyl polyether from Example 7 were introduced and heated to 60° C. Then 95 g of IPDI were added, the mixture was stirred for five minutes, and 2.82 g of TIB Kat 722 (bismuth carboxylate) were added. The mixture was stirred for 45 minutes and heated to 80° C. and 190 g of polyether of the general formula $C_4H_9O[CH_2CH(CH_3)O]_{5.6}H$ were added. This was followed by stirring for a further 3 hours.

Example 28

890 g of silyl polyether from Example 9 were introduced and heated to 60° C. Then 50 g of IPDI were added, the mixture was stirred for five minutes, and 1.04 g of TIB Kat 722 (bismuth carboxylate) were added. The mixture was stirred for 45 minutes and heated to 80° C. and 101 g of polyether of the general formula $C_4H_9O[CH_2CH(CH_3)O]_{5.6}H$ were added. This was followed by stirring for a further 3 hours.

Example 29

1349 g of silyl polyether from Example 11 were introduced and heated to 60° C. Then 50 g of IPDI were added, the mixture was stirred for five minutes, and 1.5 g of TIB Kat 722 (bismuth carboxylate) were added. The mixture was stirred for 45 minutes and heated to 80° C. and 101 g of polyether of the general formula $C_4H_9O[CH_2CH(CH_3)O]_{5.6}H$ were added. This was followed by stirring for a further 3 hours.

Example 30

1414 g of silyl polyether from Example 11 were introduced and heated to 60° C. Then 66 g of IPDI were added, the mixture was stirred for five minutes, and 1.6 g of TIB Kat 722 (bismuth carboxylate) were added. The mixture was stirred for 45 minutes and heated to 80° C. and 132 g of polyether of the general formula $C_4H_9O[CH_2CH(CH_3)O]_{5.6}H$ were added. This was followed by stirring for a further 3 hours.

Example 31

1499 g of silyl polyether from Example 12 were introduced and heated to 60° C. Then 55 g of IPDI were added, the mixture was stirred for five minutes, and 1.7 g of TIB Kat 722 (bismuth carboxylate) were added. The mixture was stirred for 45 minutes and heated to 80° C. and 110 g of polyether of the general formula $C_4H_9O[CH_2CH(CH_3)O]_{5.6}H$ were added. This was followed by stirring for a further 3 hours.

Example 32

1302 g of silyl polyether from Example 12 were introduced and heated to 60° C. Then 59 g of IPDI were added, the mixture was stirred for five minutes, and 1.5 g of TIB Kat 722 (bismuth carboxylate) were added. The mixture was stirred for 45 minutes and heated to 80° C. and 119 g of polyether of the general formula $C_4H_9O[CH_2CH(CH_3)O]_{5.6}H$ were added. This was followed by stirring for a further 3 hours.

Example 33

2863 g of silyl polyether from Example 20 were introduced and heated to 60° C. Then 108 g of IPDI were added, the mixture was stirred for five minutes, and 0.32 g of TIB Kat 722 (bismuth carboxylate) were added. The mixture was stirred for 45 minutes and heated to 80° C. and 216 g of polyether of the general formula $C_4H_9O[CH_2CH(CH_3)O]_{5.6}H$ were added. This was followed by stirring for a further 3 hours.

Examples According to Process B

Example 34

2969 g of silyl polyether from Example 2 were introduced and heated to 70° C. Then 101 g of IPDI were added, the mixture was stirred for five minutes, and 0.2 g of TIB Kat 216 (dioctyltin dilaurate) were added. The mixture was stirred for 45 minutes and 202 g of polyether of the general formula $C_4H_9O[CH_2CH(CH_3)O]_{5.6}H$ were added. The mixture was subsequently stirred at 70° C. for a further 5 hours.

Example 35

2925 g of silyl polyether from Example 13 were introduced and heated to 70° C. Then 100 g of IPDI were added, the mixture was stirred for five minutes, and 0.2 g of TIB Kat 216 (dioctyltin dilaurate) were added. The mixture was stirred for 45 minutes and 201 g of polyether of the general formula $C_4H_9O[CH_2CH(CH_3)O]_{5.6}H$ were added. The mixture was subsequently stirred at 70° C. for a further 5 hours.

Example 36

2617 g of silyl polyether from Example 14 were introduced and heated to 70° C. Then 100 g of IPDI were added, the mixture was stirred for five minutes, and 0.2 g of TIB Kat 216 (dioctyltin dilaurate) were added. The mixture was stirred for 45 minutes and 200 g of polyether of the general formula $C_4H_9O[CH_2CH(CH_3)O]_{5.6}H$ were added. The mixture was subsequently stirred at 70° C. for a further 5 hours.

Example 37

2684 g of silyl polyether from Example 15 were introduced and heated to 70° C. Then 95 g of IPDI were added, the mixture was stirred for five minutes, and 0.2 g of TIB Kat 216 (dioctyltin dilaurate) were added. The mixture was stirred for 45 minutes and 191 g of polyether of the general formula $C_4H_9O[CH_2CH(CH_3)O]_{5.6}H$ was added. The mixture was subsequently stirred at 70° C. for a further 5 hours.

Example 38

2679 g of silyl polyether from Example 18 were introduced and heated to 70° C. Then 95 g of IPDI were added, the mixture was stirred for five minutes, and 0.2 g of TIB Kat 216 (dioctyltin dilaurate) were added. The mixture was stirred for 45 minutes and 191 g of polyether of the general formula $C_4H_9O[CH_2CH(CH_3)O]_{5.6}H$ was added. The mixture was subsequently stirred at 70° C. for a further 5 hours.

Example 39

2690 g of silyl polyether from Example 19 were introduced and heated to 70° C. Then 96 g of IPDI were added, the mixture was stirred for five minutes, and 0.2 g of TIB Kat 216 (dioctyltin dilaurate) were added. The mixture was stirred for 45 minutes and 192 g of polyether of the general formula $C_4H_9O[CH_2CH(CH_3)O]_{5.6}H$ were added. The mixture was subsequently stirred at 70° C. for a further 5 hours.

Example 40

703.1 g of silyl polyether from Example 1 were introduced and heated to 70° C. Then 26.5 g of IPDI were added, the mixture was stirred for five minutes, and 0.05 g of TIB Kat 216 (dioctyltin dilaurate) were added. The mixture was stirred for 30 minutes and 53.2 g of polyether of the general formula $C_4H_9O[CH_2CH(CH_3)O]_{5.6}H$ was added. The mixture was subsequently stirred for a further 5 hours.

The endcapped examples from Table 3 are comparative examples in the case of Examples 21, 28, 31 to 33, 38, 39 and 40; the remaining examples are inventive.

TABLE 3

Viscosities of the endcapped silyl polyethers from Examples 21-40

| Example | Reaction of alkoxylation products from example | Process | Viscosity (25° C.) [Pas] |
|---|---|---|---|
| 21 | 1 | A | 72.0 |
| 22 | 2 | A | 23.6 |
| 23 | 3 | A | 22.8 |
| 24 | 4 | A | 22.4 |
| 25 | 5 | A | 24.0 |
| 26 | 6 | A | 26.3 |
| 27 | 7 | A | 20.6 |
| 28 | 9 | A | 35.3 |
| 29 | 11 | A | 25.9 |
| 30 | 11 | A | 16.9 |
| 31 | 12 | A | 55.2 |
| 32 | 12 | A | 41.2 |
| 33 | 20 | A | 41.0 |
| 40 | 1 | B | 34.5 |
| 34 | 2 | B | 20.5 |
| 38 | 18 | B | 186 |
| 35 | 13 | B | 152 |
| 36 | 14 | B | 125 |
| 39 | 19 | B | 85.6 |
| 37 | 15 | B | 34.5 |

TABLE 4

Mechanical characteristic values of the cured formulation on an S2 dumbbell specimen and on an overlap bond of two V2A steel plates:

| | S2 dumbbell specimen | | Adhesive bond |
|---|---|---|---|
| Polymer of example | Elongation at break [%] | tensile stress at break [N/mm$^2$] | tensile shear strength [N/mm$^2$] |
| 21 | 212 | 1.73 | 1.34 |
| 22 | 203 | 1.54 | 1.44 |
| 23 | 216 | 1.61 | 1.49 |
| 24 | 194 | 1.60 | 1.47 |
| 25 | 168 | 1.51 | 1.57 |
| 26 | 121 | 1.52 | 1.47 |
| 27 | 185 | 1.45 | 1.54 |
| 28 | 182 | 1.23 | 1.07 |
| 29 | 204 | 1.41 | 1.49 |
| 30 | 221 | 1.35 | 1.33 |
| 31 | 154 | 1.48 | 1.69 |
| 32 | 151 | 1.25 | 1.32 |
| 33 | 188 | 1.52 | 1.71 |
| 40 | 189 | 1.60 | 1.34 |
| 34 | 152 | 1.52 | 1.63 |
| 38 | 165 | 1.31 | 1.16 |
| 35 | 126 | 1.49 | 1.49 |
| 36 | 112 | 1.70 | 1.74 |
| 39 | 206 | 1.38 | 1.09 |
| 37 | 163 | 1.44 | 1.27 |

Preparation of the Room-Temperature-Applicable Adhesive/Sealant Formulations:

25.9 wt % of the alkoxylation product from the respective examples was intensively mixed with 18.1 wt % of diisoundecyl phthalate, 51.1 wt % of precipitated chalk (Socal® U1S2, Solvay), 0.5 wt % of titanium dioxide (Kronos® 2360, Kronos), 1.4 wt % of adhesion promoter (Dynasylan® AMMO, Evonik), 1.1 wt % of drying agent (Dynasylan® VTMO, Evonik), 1.5 wt % of an antioxidant/stabilizer mixture (ratio of Irganox® 1135 to Tinuvin® 1130 to Tinuvin® 292=1:2:2 ratio) and 0.4 wt % of the curing catalyst (TIB® KAT 223, TIB) in a mixer (Speedmixer® FVS 600, Hausschild). The completed formulation was transferred to PE cartridges, and was stored for at least 24 hours at room temperature prior to application. Given that the formulations of the alkoxylation products in the examples stated above were identical in all cases, the discussion of the results has been carried out with identification of the alkoxylation product utilized as the basis of the formulation.

Determination of Tensile Stress at Break and Elongation at Break in Accordance with DIN 53504:

The formulation was knifecoated in a film thickness of 2 mm on a PE surface. The films were stored for 7 days at 23° C. and 50% relative humidity. S2 dumbbell specimens were then punched from the films with the aid of a cutter and a toggle press.

The dumbbell specimens thus produced were clamped for testing into a universal testing machine (from Shimadzu), and determinations were made of the tensile stress at break and elongation at break when the specimens were stretched at a constant velocity (200 mm/min).

Determination of the Tensile Shear Strength of Overlap Bonds in Accordance with DIN EN 1465

Overlap bonds were produced with the prepared formulation. For these bonds, two stainless steel substrates (V2A, 1.4301) were used. The region of the overlap bond amounted to 500 mm$^2$. The bonds were cured at 23° C. and 50% relative humidity. After 21 days, the bonds were clamped into a universal testing machine (from Shimadzu), and a force was exerted on the adhesive bond at a constant rate (10 mm/min) until the bond fractured. The tensile shear strength was ascertained.

It is clearly apparent from the viscosities shown in Tables 2 and 3 that the viscosity of the inventive alkoxylation products, prepared by the inventive process through the use of starters (2) during the alkoxylation, leads to a significant reduction in the viscosity. Non-inventive compositions have a viscosity which is higher by at least 10% than the viscosity of the inventive compositions.

According to Table 2, in the case of the inventive alkoxylation products with terminal OH groups from Examples 2-7 and 11, for which a polyether (PPG 2000) was employed as starter, a reduction in the viscosity by at least 50% is recorded, relative to comparative Example 1, where no starter (2) is used. Where the functionality of starter (2) is identical to starter (1) or higher, there is always still a marked reduction observed in the viscosity by comparison with Example 1, of around 30% (Examples 8, 9, 12). This relatively small viscosity reduction effect is clear proof that it is particularly advantageous to use starter (2), with a functionality reduced by 1 relative to starter (1).

As shown by Example 14 (with starter (2)) in comparison to starter 18 (without starter (2)) and by Example 15 (with starter (2)) in comparison to Example 19 (without starter (2)), the effect of the lowering of the viscosity can also be transposed to chemically different (non-polyether) starters. A polycarbonate (Desmophen C 2200 in Example 14 or 18) and a polyester (Baycoll AD 2055 in Example 15 or 19) were used in the inventive process, and in both cases a viscosity reduction of at least 40% was observed, relative to the comparative examples, through the addition of 1-butanol as starter (2).

This trend can also be read off in Table 3, in the case of the alkoxylation products reacted with isocyanates. In the case of the alkoxylation products endcapped by process A, a reduction in viscosity of at least 60% is recorded when the alkoxylation products were prepared beforehand with starters (2) having a lower OH functionality than the starter (1). Where the OH functionality of the two starters is identical, a smaller viscosity is found in comparison to Example 21, where exclusively one starter (1) was used. The reduction is of the order of 20-50%. This trend is also continued for the alkoxylation products endcapped by process B. Here, however, a smaller absolute reduction in the viscosity is recorded. In Example 34, in comparison to Example 40, the viscosity is reduced by 40%, whereas for the analogous products endcapped by process A, a reduction of around 65% is recorded on comparison of Example 21 with Example 22.

Where the alkoxylation products were prepared beforehand with starters (2) having a lower OH functionality than the starter (1), a particularly good reduction in viscosity is recorded. Also situated within a similar range are the viscosity reductions for the inventive products based on polycarbonates (reduction in viscosity by about 30%; see Example 38 relative to 36) or polyesters (reduction in viscosity by about 60%; see Example 39 relative to 37) as starters.

Furthermore, from the results in Tables 2 and 3, it can be worked out that for a significant reduction of viscosity it is immaterial which kind of starter (2) is used, this being especially apparent for the inventive examples where starter (1) has a higher OH functionality than starter (2).

From the results from Table 2, moreover, it can be discerned that the reduction in viscosity can be influenced by the amount of starter (2) added. The greater the amount of starter (2) employed, the greater the effect of the reduction in viscosity. For the endcapped compounds from Table 3, this effect is somewhat diminished, but still clearly apparent.

From Examples 24, 25 and 35, moreover, it can be seen that the extent of the reduction in viscosity as well can be controlled through the timing of the addition of the starter (2).

The mechanical characteristic values of the inventive alkoxylation products with intrinsically reduced viscosity are summarized in Table 4, and, surprisingly, for alkoxylation products endcapped by process A, they show no significant deviations from the mechanical characteristic values of comparative Example 21 with heightened viscosity. In contrast, in the case of the mechanical characteristic values of the alkoxylation products endcapped by process A, there is in fact overall a positive influence. While the elongations at break of the inventive Examples 34 to 37 are slightly reduced by comparison with comparative Examples 38 to 40, this effect is nevertheless more than compensated by a significant improvement in the breaking stress in the adhesive bond.

Comparative Examples 20 and 33, hitherto disregarded, will be looked at separately and in somewhat more detail. These polyethers are silyl polyethers which in structural terms correspond to inventive Examples 2 and 22, respectively, but in contrast to them were not prepared by the inventive process. In order to copy the structure of Example 2, the starters (1) and (2) were reacted in two separate batches, and the moles of the monomers of blocks 2+3 as per Table 2 were added onto these starters (1) and (2), the molar amounts being in proportion with regard to the OH groups of the starter. In Example 16, therefore, ⅔ of the monomers of blocks 2 and 3, in analogy to Example 2, were added onto PPG 2000. Analogously, in Example 17 ⅓ of the respective monomers was added on. For the sake of simplicity, starting took place in Example 17 not directly from butanol, but instead from an adduct of butanol+5.5 PO. This was taken into account accordingly in the formulation.

Subsequently, these polymers were mixed in Example 20 and reacted with IPDI in Example 33. From the viscosity of Example 20 it is clear that this mixing of silyl polyethers with different functionalities also results in a comparable reduction of viscosity, which is within the range of inventive Examples 2-7 and 11, but this effect is not sustained in the target subsequent reaction. The endcapped subsequent product as per Example 33 does still have a viscosity reduced by almost 60% in comparison to comparative Example 21; however, the viscosity reduction effect is still much greater in reference Example 2, being almost twice as large. On the basis of the applications properties of comparative Example 33, set out in Table 4, it is also impossible to discern any noticeable effect. Both breaking stress and elongation at break are comparable to reference Example 21.

It is therefore found, surprisingly, that the change in the compositions of the inventive alkoxylation products through the use of starters (2) has no noticeable influence on the important application properties of the formulations, which derive from the inventive alkoxylation products prepared by the inventive process, and it is possible nevertheless to obtain products which are comparable in performance terms and have a noticeably reduced viscosity. All the more surprising is the fact that in the case of the adhesive application, it was in fact possible to improve the tensile shear strength.

The invention claimed is:

1. A composition comprising alkoxylation product mixtures with intrinsically reduced viscosity, obtained by alkoxylation of epoxy-functional compounds in the presence of at least two different OH-functional starters, a starter (1) and a starter (2),
   wherein the starter (1) has a molar mass of greater than 400 g/mol and the starter (2) has a molar mass of less than or equal to 400 g/mol, wherein the epoxy functional compounds comprise an epoxide carrying an alkoxysilyl group, an alkoxysilylalkyl glycidyl ether group, or both.

2. The composition according to claim 1, wherein the molar mass of the starter (1) exceeds the molar mass of the starter (2) by at least 200 g/mol.

3. The composition according to claim 1, wherein the molar mass of the starter (1) exceeds the molar mass of the starter (2) by at least 600 g/mol.

4. The composition according to claim 1, wherein the starter (1) has t OH groups and the starter (2) has t−1 OH groups, wherein t=2 to 8.

5. The composition according to claim 1, wherein the alkoxylation products (1) from the starter (1) are obtained from alkylene oxide, from at least one epoxide carrying alkoxysilyl groups, and optionally from further monomers, and the alkoxylation products (2) from the starter (2) are obtained from alkylene oxide and optionally from at least one epoxide carrying alkoxylsilyl groups, from further monomers, or both.

6. The composition according to claim 5, wherein the starter 1 is polypropylene glycol, the starter 2 is selected from the group consisting of 1-butanol, 2-propyl-1-heptanol, 2-ethyl-1-hexanol, and 2,2,4-trimethyl-1,3-pentanediol monoisobutyrate, the alkylene oxide is propylene oxide, and the epoxide carrying alkoxysilyl is (3-glycidyloxypropyl)triethoxysilane, and
   wherein the composition has an intrinsic viscosity of less than 10 Pa·s at 25° C.

7. The composition according to claim 1, wherein the alkoxylation products (1) from the starter (1) are obtained from ethylene oxide, propylene oxide, or both, from at least one alkoxysilylalkyl glycidyl ether and optionally from further monomers, and the alkoxylation products (2) from the starter (2) are obtained from ethylene oxide, propylene oxide, or both, and from at least one alkoxysilylalkyl glycidyl ether, from further monomers or both.

8. The composition according to claim 1, wherein the alkoxylation products (1) are obtained from the following monomer fractions, comprising:

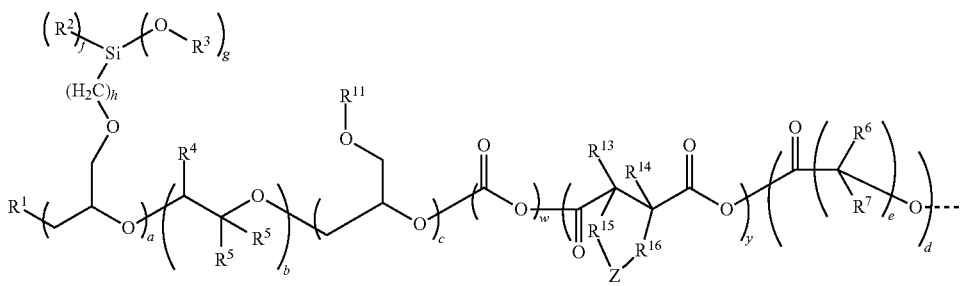

10 to 97 wt % of propylene oxide, 0 to 60 wt % of ethylene oxide, 0 to 25 wt % of alkoxysilylalkyl glycidyl ethers and 0 to 25 wt % of further monomers, based on the total weight of the alkoxylation products (1); and the alkoxylation products (2) are obtained from the following monomer fractions, comprising:

10 to 97 wt % of propylene oxide, 0 to 60 wt % of ethylene oxide, 0 to 25 wt % of alkoxysiylalkyl glycidyl ethers and 0 to 25 wt % of further monomers, based on the total weight of the alkoxylation products (2).

9. The composition according to claim 8, wherein the alkoxylation products (1), the alkoxylation products (2) or both are obtained from monomer fractions comprising 0.1 to 25 wt % of alkoxysilylalkyl glycidyl ethers based on the total weight of the alkoxylation products.

10. The composition according to claim 1, wherein the starter (1) is selected from the group consisting of polyetherols, polycarbonate polyols, polyethercarbonates, and mixtures thereof.

11. The composition according to claim 1, wherein the starter (2) is selected from the group consisting of butanol, ethanol, ethylhexanol, and mixtures thereof.

12. The composition according to claim 1, wherein the composition comprises at least an alkoxylation product (1) and an alkoxylation product (2), wherein the alkoxylation product (1) obtained by the starter (1) conforms to formula (I) and the alkoxylation product (2) obtained by the starter (2) conforms to formula (IIa):

$$M_i D_j T_k Q_l UR_u AP_v$$ formula (I)

wherein fragments M, D, T, and Q are linked not to one another but instead with one another via the groups UR, AP, or both and the groups UR and AP are not linked to one another but are linked with one another via fragments M, D, T, or Q, wherein
i=0 to 16,
j=0 to 10,
k=0 to 6,
l=0 to 4,
u=0 to 17, and
v=0 to 6,
with the proviso that i+j+k+l is greater than or equal to 1,
M independently at each occurrence is an oxygen-radical carrying hydrocarbon radical having a minimum numerical molar mass of 32 g/mol, which may optionally be interrupted by heteroatoms, Or is a radical of the formula (Ia) or of the formula (Ib) or of the formula (Ic) with formula (Ia)

wherein
a=0 to 100,
b=1 to 1000,
c=0 to 200,
d=0 to 200,
m is an integer from 0 to 200,
n is an integer from 0 to 500,
e=1 to 10,
f=0 to 2
g=1 to 3
with the proviso that g+f=3 and g is at least 1, and
h=0 to 10
with the proviso that the various monomer units of the fragments with the indices a, b, c, d, w, and y may be constructed blockwise among one another or else are subject to a statistical distribution and are freely permutable among one another, it being disallowed for each of the groups with the indices w and y to follow itself or the other respective group, and wherein
$R^1$=independently at each occurrence a saturated or unsaturated, linear or branched organic hydrocarbon radical which may contain at least one of O, S and N as heteroatoms,
$R^2$=independently at each occurrence an alkyl group having 1 to 8 carbon atoms,
$R^3$=independently at each occurrence an alkyl group having 1 to 8 carbon atoms,
$R^4$=independently at each occurrence a hydrogen radical, an alkyl group having 1 to 20 carbon atoms, or an aryl or alkaryl group, or
$R^4$ and one of the radicals $R^5$ may together form a ring which includes the atoms to which $R^4$ and $R^5$ are bonded,
$R^5$=independently at each occurrence a hydrogen radical or an alkyl group having 1 to 8 carbon atoms,
$R^6$, $R^7$=independently at each occurrence a hydrogen radical, an alkyl group having 1 to 20 carbon atoms, or at least one of an aryl or alkaryl group, and an alkoxy group,
$R^{11}$=independently at each occurrence a saturated or unsaturated, aliphatic or aromatic hydrocarbon radical having 2 to 30 C atoms, which is optionally substituted,
$R^{13}$, $R^{14}$=independently at each occurrence hydrogen, an organic radical, or both, or else optionally $R^{13}$, $R^{14}$, or both may be absent, and, if $R^{13}$ and $R^{14}$ are absent, there is a C=C double bond in place of the radicals $R^{13}$ and $R^{14}$, the bridging fragment Z may be present or absent;
if the bridging fragment Z is absent, then
$R^{15}$, $R^{16}$=independently at each occurrence hydrogen, and/or an organic radical, or both, and, if one of the radicals $R^{13}$ or $R^{14}$ is absent, the respective geminal radical, $R^{15}$ if $R^{13}$ is absent and $R^{16}$ if $R^{14}$ is absent, is an alkylidene radical,
if the bridging fragment Z is present, then
$R^{15}$ and $R^{16}$=hydrocarbon radicals which are bridged cycloaliphatically or aromatically via the fragment Z, Z representing a divalent alkylene or alkenylene radical which may be further substituted,

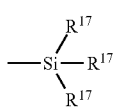

formula (Ib)

wherein
$R^{17}$=independently at each occurrence a linear or branched, saturated or unsaturated, optionally further-substituted alkyl group having 1 to 30 carbon atoms, or an aryl or alkaryl group,

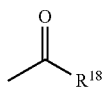

formula (Ic)

wherein
$R^{18}$=independently at each occurrence a divalent linear or cyclic, saturated or unsaturated alkyl or aryl group, which may be substituted, and
wherein, for the fragments D, T and Q:
D is a polyether radical $-(D^A)_t D^X$ where t is 2,
T is a polyether radical $-(D^A)_t D^X$ where t is 3, and
Q is a polyether radical $-(D^A)_t D^X$ where t is 4,
wherein
$D^X$ is a t-valent functional, saturated or unsaturated, linear or branched organic hydrocarbon radical, which may contain at least one of O, S, Si and N as heteroatoms, with each of the radicals $D^A$ being covalently bonded to the radical $D^X$, and
wherein $D^A$ is a fragment of formula (II)

wherein a to h, w, x and y and $R^2$ to $R^{16}$ independently at each occurrence are defined as in formula (Ia),
with the proviso that the sum of all the indices a from formula (Ia) and formula (II) must be greater than or equal to 1,
UR independently at each occurrence are identical or different divalent radicals of the formula —U-$D^C$-U—,
or a monovalent radical of the form $D^D$-U—,
or a trivalent radical of the form $D^E U_3$,
or a tetravalent radical of the form $D^F U_4$,
wherein
U is a —C(O)—NH— group which is bonded via the nitrogen to $D^C$, $D^E$, $D^F$, or $D^D$, and
$D^C$ independently at each occurrence is a divalent substituted or unsubstituted, linear or branched, saturated or unsaturated hydrocarbon radical having 1 to 30 carbon atoms, selected from alkyl, alkenyl, aryl or alkaryl radicals, which may optionally be interrupted by at least one of O, N, and S as heteroatoms, and
$D^D$ independently at each occurrence is a monovalent linear or branched, saturated or unsaturated hydrocarbon radical having 1 to 30 carbon atoms, selected from alkyl, alkenyl, aryl or alkaryl radicals, which may be interrupted by at least one of O, N, and S as heteroatoms, may carry further functional groups, or both, and
$D^E$ independently at each occurrence is a trivalent substituted or unsubstituted, linear or branched, saturated or unsaturated hydrocarbon radical having 1 to 30 carbon atoms, selected from alkyl, alkenyl, aryl or alkaryl radicals, which may be interrupted by at least one of O, N, and S as heteroatoms, may carry further functional groups, or both, and
$D^F$ independently at each occurrence is a tetravalent substituted or unsubstituted, linear or branched, saturated or unsaturated hydrocarbon radical having 1 to 30 carbon atoms, selected from alkyl, alkenyl, aryl or alkaryl radicals, which may be interrupted by at least one of O, N, and S as heteroatoms, may carry further functional groups, or both, and
AP independently at each occurrence are identical or different radicals of the general formula (IIIa), (IIIb) or (IIIc)

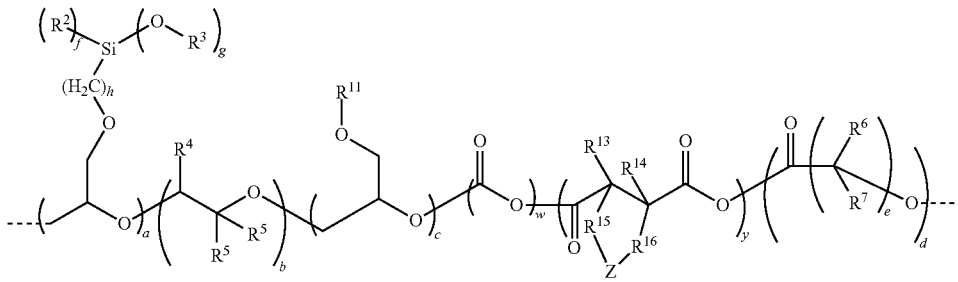

formula (II)

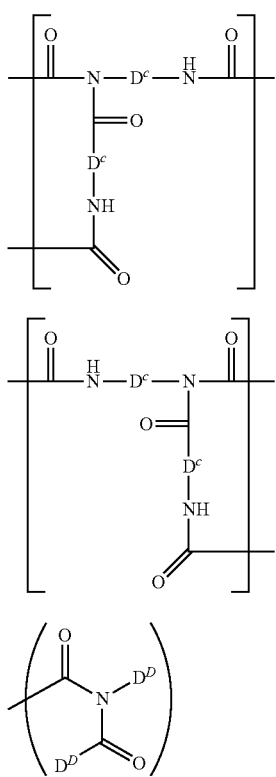

formula (IIIa)

formula (IIIb)

formula (IIIc)

or if polyisocyanates with the structural units $D^E$, $D^F$, or both are used, additionally structural elements analogous to formula (IIIa), formula (IIIb), or both where the three urethane units bonded to $D^E$, the four urethane units bonded to $D^F$, or both independently at each occurrence, have all or in part been further reacted to give allophanate structural units in the formulae (IIIa) and (IIIb), and with the alkoxylation product (2) of the formula (IIa)

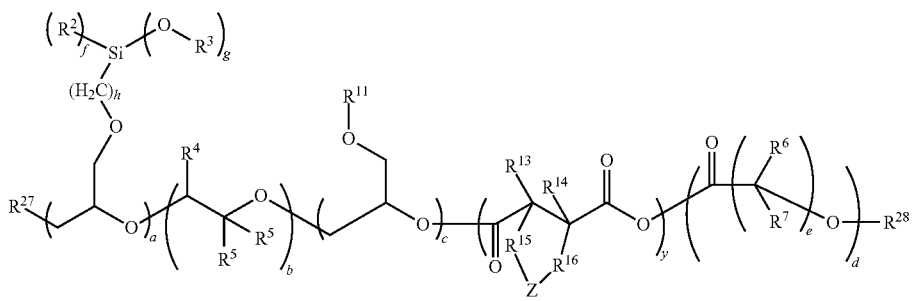

formula (IIa)

wherein
a=1 to 100,
b=1 to 200,
c=0 to 100,
d=0 to 100,
w=0 to 100,
y=0 to 50,
e=1 to 10,
f=0 to 2
g=1 to 3 with the proviso that the groups with the indices a, b, c, d and y are freely permutable over the molecule chain, it being disallowed for each of the groups having the index y to follow themselves, and with the proviso that the different monomer units and the fragments with the indices, a, b, c, d and y may be constructed blockwise among one another, in which case individual blocks may also occur multiply and may be distributed statistically among one another, or else are subject to a statistical distribution and are freely permutable among one another being for arrangement in any desired sequence, subject to the restriction that each of the groups with the indices w and y is not allowed to follow itself or the other respective group, and with the radicals $R^2$, $R^3$, $R^4$, $R^5$, $R^6$, $R^7$, $R^{11}$, $R^{13}$, $R^{14}$, $R^{15}$ and $R^{16}$ being as defined in formula (Ia), and wherein $R^{27}$=independently at each occurrence a saturated or unsaturated, linear or branched organic hydrocarbon radical which may contain at least one of O, S and N as heteroatoms;

$R^{28}$=independently at each occurrence hydrogen or a fragment, bonded via UR or AP, of the formulae (II) or (IIa).

13. A process for preparing a composition according to claim 12, the process comprising:
reacting at least one starter (1) with a glycidyl ether, at least one alkylene oxide or both; and
reacting at least one starter (2) with the glycidyl ether, at least one alkylene oxide or both;
wherein the glycidyl ether is a compound of the general formula (V)

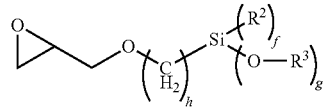

formula (V)

wherein the starter (1), the starter (2), or both are reacted with the glycidyl ether; and wherein the starter (1) and the starter (2) are OH-functional compounds, and the starter (1) has a molar mass of greater than 400 g/mol and the starter (2) has a molar mass of less than or equal to 400 g/mol.

14. A curable composition comprising at least one composition according to claim 1 and at least one curing catalyst.

15. A process for preparing compositions comprising alkoxylation products (1) and alkoxylation products (2), comprising:
   a. reacting at least one starter (1) with at least one alkylene oxide; and
   b. reacting at least one starter (2) with at least one alkylene oxide;
   wherein the starter (1) and the starter (2) are OH-functional compounds, and the starter (1) has a molar mass of greater than 400 g/mol and the starter (2) has a molar mass of less than or equal to 400 g/mol, wherein the at least one starter (1), the at least one starter (2), or both, are reacted with greater than 0.1 to 25 wt % of alkoxysilylalkyl glycidyl ethers based on the total weight of monomers used.

16. The process according to claim 15, in wherein the reacting step b) takes places during the ongoing alkoxylation of the reacting step a).

17. The process according claim 15, wherein the molar mass of the starter (1) exceeds the molar mass of the starter (2) by at least 600 g/mol.

18. The process according to claim 15, wherein the starter (1) has t OH groups and the starter (2) has t−1 OH groups, wherein t=2 to 8.

19. The process according to claim 15, further comprising:
   c. reacting at least one starter (1) with 10 to 97 wt % of propylene oxide, 0 to 60 wt % of ethylene oxide, greater than 0.1 to 25 wt % of alkoxysilyl glycidyl ethers and 0 to 25 wt % of further monomers, based on the total weight of the monomers used,
   d. reacting at least one starter (2) with 10 to 97 wt % of propylene oxide, 0 to 60 wt % of ethylene oxide, greater than 0.1 to 25 wt % of alkoxysilyl-glycidyl ethers and 0 to 25 wt % of further monomers, based on the total weight of the monomers used.

\* \* \* \* \*